United States Patent
Dukes et al.

(10) Patent No.: US 9,565,620 B2
(45) Date of Patent: Feb. 7, 2017

(54) DYNAMIC ROUTING IN A MESH NETWORK

(71) Applicant: Mueller International, LLC, Atlanta, GA (US)

(72) Inventors: Brent Dukes, Raynham, MA (US); David Splitz, Sandwich, MA (US); Dale McLeod Magley, Middleboro, MA (US); Robert Henry Grady, Rumford, RI (US)

(73) Assignee: Mueller International, LLC, Atlanta, GA (US)

( * ) Notice: Subject to any disclaimer, the term of this patent is extended or adjusted under 35 U.S.C. 154(b) by 163 days.

(21) Appl. No.: 14/475,050

(22) Filed: Sep. 2, 2014

(65) Prior Publication Data

US 2016/0066249 A1    Mar. 3, 2016

(51) Int. Cl.
*H04W 40/24* (2009.01)
*H04W 84/18* (2009.01)

(52) U.S. Cl.
CPC ......... *H04W 40/246* (2013.01); *H04W 40/248* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 691,904 A | 1/1902 | Hallbergh | |
| 1,165,429 A | 12/1915 | Mass | |
| 1,788,618 A | 1/1931 | Cover | |
| 1,808,209 A | 6/1931 | Earl | |
| 1,808,212 A | 6/1931 | Earl | |
| 2,302,529 A | 11/1942 | Cornell et al. | |
| 3,254,660 A | 6/1966 | Ray | |

(Continued)

FOREIGN PATENT DOCUMENTS

| AU | 2009308949 | 5/2010 |
|---|---|---|
| AU | 2010249499 | 5/2015 |

(Continued)

OTHER PUBLICATIONS

Ball, Marty Scott, Notice of Allowance for U.S Appl. No. 12/326,240, filed Jan. 20, 2009, mailed Aug. 9, 2010, 10 pgs.

(Continued)

*Primary Examiner* — Kodzovi Acolatse
(74) *Attorney, Agent, or Firm* — Taylor English Duma LLP

(57) ABSTRACT

Technologies are described herein for dynamically determining and assigning parent nodes and routes for nodes in a mesh network. A host sends a command message to one or more nodes of the mesh network. The command message is configured to cause the nodes to collect communication parameters regarding neighboring nodes and to upload neighbor lists containing the communication parameters regarding the neighboring nodes to the host. The host then calculates a link score for the pairs of neighboring nodes in the mesh network based on the communication parameters in the uploaded neighbor lists and assigns one or more parent nodes to at least one of the nodes based on the calculated link scores. The host then sends a command message to the node causing the node to reconfigure based on the command message and begin communicating through the newly assigned one or more parent nodes.

20 Claims, 7 Drawing Sheets

(56) References Cited

U.S. PATENT DOCUMENTS

| | | |
|---|---|---|
| 3,593,957 A | 7/1971 | Dolter et al. |
| 3,653,261 A | 4/1972 | Feldman |
| 3,672,233 A | 6/1972 | Hjermstad |
| 3,705,385 A | 12/1972 | Batz |
| 3,731,534 A | 5/1973 | Painley et al. |
| 3,795,144 A | 3/1974 | Marchesi |
| 4,093,997 A | 6/1978 | Germer |
| 4,120,031 A | 10/1978 | Kincheloe et al. |
| 4,126,338 A | 11/1978 | Coel |
| 4,291,375 A | 9/1981 | Wolf |
| 4,388,690 A | 6/1983 | Lumsden |
| 4,414,633 A | 11/1983 | Churchill |
| 4,442,492 A | 4/1984 | Karlsson et al. |
| 4,465,970 A | 8/1984 | DiMassimo et al. |
| 4,516,213 A | 5/1985 | Gidden |
| 4,542,469 A | 9/1985 | Brandberry et al. |
| 4,591,988 A | 5/1986 | Klima et al. |
| 4,707,852 A | 11/1987 | Jahr et al. |
| 4,727,900 A | 3/1988 | Dooling et al. |
| 4,778,204 A | 10/1988 | Berger |
| 4,792,946 A | 12/1988 | Mayo |
| 4,803,632 A | 2/1989 | Frew et al. |
| 4,833,618 A | 5/1989 | Verma et al. |
| 4,868,566 A | 9/1989 | Strobel et al. |
| 4,881,070 A | 11/1989 | Burrowes et al. |
| 4,901,751 A | 2/1990 | Story |
| 4,940,976 A | 7/1990 | Gastouniotis et al. |
| 4,953,403 A | 9/1990 | Springer |
| 4,967,996 A | 11/1990 | Sonoda et al. |
| 4,989,830 A | 2/1991 | Ratnik |
| 5,056,107 A | 10/1991 | Johnson et al. |
| 5,075,792 A | 12/1991 | Brown et al. |
| 5,079,715 A | 1/1992 | Venkataraman et al. |
| 5,121,344 A | 6/1992 | Laage et al. |
| 5,239,575 A | 8/1993 | White et al. |
| 5,251,480 A | 10/1993 | Brunson, IV et al. |
| 5,261,275 A | 11/1993 | Davis |
| 5,267,587 A | 12/1993 | Brown |
| 5,298,894 A | 3/1994 | Cerny et al. |
| 5,371,734 A | 12/1994 | Fischer |
| 5,381,136 A | 1/1995 | Powers et al. |
| 5,434,911 A | 7/1995 | Gray et al. |
| 5,437,481 A | 8/1995 | Spears et al. |
| 5,438,329 A | 8/1995 | Gastounioulis et al. |
| 5,451,938 A | 9/1995 | Brennan, Jr. |
| 5,459,459 A | 10/1995 | Lee |
| 5,481,259 A | 1/1996 | Bane |
| 5,493,287 A | 2/1996 | Bane |
| 5,509,567 A | 4/1996 | Lindahl |
| 5,519,387 A | 5/1996 | Besier et al. |
| 5,525,898 A | 6/1996 | Lee et al. |
| 5,553,094 A | 9/1996 | Johnson et al. |
| 5,590,179 A | 12/1996 | Shincovich et al. |
| 5,594,740 A | 1/1997 | LaDue |
| 5,594,776 A | 1/1997 | Dent |
| 5,617,084 A | 4/1997 | Sears |
| 5,631,554 A | 5/1997 | Briese et al. |
| 5,654,692 A | 8/1997 | Baxter, Jr. et al. |
| 5,655,299 A | 8/1997 | Lindahl |
| 5,666,655 A | 9/1997 | Ishikawa et al. |
| 5,673,252 A | 9/1997 | Johnson et al. |
| 5,708,195 A | 1/1998 | Kurisu et al. |
| 5,714,931 A | 2/1998 | Petite |
| 5,746,344 A | 5/1998 | Syler et al. |
| 5,748,104 A | 5/1998 | Argyroudis et al. |
| 5,751,797 A | 5/1998 | Saadeh |
| 5,754,101 A | 5/1998 | Tsunetomi et al. |
| 5,767,790 A | 6/1998 | Jovellana |
| 5,787,358 A | 7/1998 | Takahashi |
| 5,801,643 A | 9/1998 | Williams et al. |
| 5,815,086 A | 9/1998 | Ivie et al. |
| 5,852,658 A | 12/1998 | Knight et al. |
| 5,877,703 A | 3/1999 | Bloss et al. |
| 5,892,441 A | 4/1999 | Woolley et al. |
| 5,892,758 A | 4/1999 | Argyroudis |
| 5,907,491 A | 5/1999 | Canada et al. |
| 5,924,051 A | 7/1999 | Provost et al. |
| 5,926,103 A | 7/1999 | Petite |
| 5,926,531 A | 7/1999 | Petite |
| 5,940,009 A | 8/1999 | Loy et al. |
| 5,963,146 A | 10/1999 | Johnson et al. |
| 5,963,557 A | 10/1999 | Eng |
| 5,971,011 A | 10/1999 | Price |
| 5,979,863 A | 11/1999 | Lousberg |
| 5,986,573 A | 11/1999 | Franklin et al. |
| 5,994,892 A | 11/1999 | Turino et al. |
| 5,996,608 A | 12/1999 | Hunter |
| 6,006,212 A | 12/1999 | Schleich et al. |
| 6,028,522 A | 2/2000 | Petite |
| 6,028,855 A | 2/2000 | Hirsch |
| 6,031,455 A | 2/2000 | Grube et al. |
| 6,031,466 A | 2/2000 | Leshets et al. |
| 6,044,062 A | 3/2000 | Brownrigg et al. |
| 6,058,374 A | 5/2000 | Guthrie et al. |
| 6,060,994 A | 5/2000 | Chen |
| 6,069,571 A | 5/2000 | Tell |
| 6,081,204 A | 6/2000 | Lavoie et al. |
| 6,115,677 A | 9/2000 | Perthold et al. |
| 6,150,955 A | 11/2000 | Tracy et al. |
| 6,152,173 A | 11/2000 | Makowan |
| 6,163,276 A | 12/2000 | Irving et al. |
| 6,172,616 B1 | 1/2001 | Johnson et al. |
| 6,178,816 B1 | 1/2001 | Katzman et al. |
| 6,195,018 B1 | 2/2001 | Ragle et al. |
| 6,208,266 B1 | 3/2001 | Lyons et al. |
| 6,218,953 B1 | 4/2001 | Petite |
| 6,233,327 B1 | 5/2001 | Petite |
| 6,246,677 B1 | 6/2001 | Nap et al. |
| 6,249,516 B1 | 6/2001 | Brownrigg et al. |
| 6,288,641 B1 | 9/2001 | Casais |
| 6,317,051 B1 | 11/2001 | Cohen |
| 6,333,975 B1 | 12/2001 | Brunn et al. |
| 6,373,399 B1 | 4/2002 | Johnson et al. |
| 6,392,538 B1 | 5/2002 | Shere |
| 6,405,047 B1 | 6/2002 | Moon |
| 6,424,270 B1 | 7/2002 | Ali |
| 6,426,027 B1 | 7/2002 | Scarborough et al. |
| 6,430,268 B1 | 8/2002 | Petite |
| 6,437,692 B1 | 8/2002 | Petite et al. |
| 6,453,247 B1 | 9/2002 | Hunaidi |
| 6,456,197 B1 | 9/2002 | Lauritsen et al. |
| 6,470,903 B2 | 10/2002 | Reyman |
| 6,493,377 B2 | 12/2002 | Schilling et al. |
| 6,512,463 B1 | 1/2003 | Campbell et al. |
| 6,528,957 B1 | 3/2003 | Luchaco |
| 6,536,469 B2 | 3/2003 | Dilger et al. |
| 6,538,577 B1 | 3/2003 | Ehrke et al. |
| 6,560,543 B2 | 5/2003 | Wolfe et al. |
| 6,564,159 B1 | 5/2003 | Lavoie et al. |
| 6,568,416 B2 | 5/2003 | Tucker |
| 6,577,961 B1 | 6/2003 | Holdsclaw et al. |
| 6,581,458 B1 | 6/2003 | Hathaway et al. |
| 6,618,578 B1 | 9/2003 | Petite |
| 6,618,709 B1 | 9/2003 | Sneeringer |
| 6,624,750 B1 | 9/2003 | Marman et al. |
| 6,628,207 B1 | 9/2003 | Hemminger et al. |
| 6,628,764 B1 | 9/2003 | Petite |
| 6,633,781 B1 | 10/2003 | Lee et al. |
| 6,653,945 B2 | 11/2003 | Johnson et al. |
| 6,657,552 B2 | 12/2003 | Belski et al. |
| 6,675,071 B1 | 1/2004 | Griffin, Jr. et al. |
| 6,677,861 B1 | 1/2004 | Henry et al. |
| 6,701,956 B1 | 3/2004 | Berger |
| 6,710,721 B1 | 3/2004 | Holowick |
| 6,747,557 B1 | 6/2004 | Petite et al. |
| 6,798,352 B2 | 9/2004 | Holowick |
| 6,816,072 B2 | 11/2004 | Zoratti |
| 6,836,737 B2 | 12/2004 | Petite et al. |
| 6,847,300 B2 | 1/2005 | Yee et al. |
| 6,848,303 B2 | 2/2005 | Oeder et al. |
| 6,880,567 B2 | 4/2005 | Klaver |
| 6,891,838 B1 | 5/2005 | Petite et al. |
| 6,912,472 B2 | 6/2005 | Mizushina et al. |
| 6,914,533 B2 | 7/2005 | Petite |

(56) References Cited

U.S. PATENT DOCUMENTS

| | | |
|---|---|---|
| 6,914,893 B2 | 7/2005 | Petite |
| 6,931,445 B2 | 8/2005 | Davis |
| 6,946,972 B2 | 9/2005 | Mueller et al. |
| 6,952,970 B1 | 10/2005 | Furmidge |
| 6,954,701 B2 | 10/2005 | Wolfe |
| 6,954,814 B1 | 10/2005 | Leach |
| 6,972,677 B2 | 12/2005 | Coulthard |
| 6,978,210 B1 | 12/2005 | Suter et al. |
| 6,980,079 B1 | 12/2005 | Shintani et al. |
| 6,982,651 B2 | 1/2006 | Fischer |
| 7,008,239 B1 | 3/2006 | Ju |
| 7,009,530 B2 | 3/2006 | Zigdon et al. |
| 7,012,546 B1 | 3/2006 | Zigdon et al. |
| 7,042,368 B2 | 5/2006 | Patterson et al. |
| 7,053,767 B2 | 5/2006 | Petite et al. |
| 7,054,271 B2 | 5/2006 | Brownrigg |
| 7,061,924 B1 | 6/2006 | Durrant et al. |
| 7,072,945 B1 | 7/2006 | Nieminen |
| 7,079,810 B2 | 7/2006 | Petite et al. |
| 7,088,239 B2 | 8/2006 | Basinger et al. |
| 7,089,125 B2 | 8/2006 | Sonderegger |
| 7,099,781 B1 | 8/2006 | Heidl et al. |
| 7,103,511 B2 | 9/2006 | Petite |
| 7,111,817 B2 | 9/2006 | Teti et al. |
| 7,117,051 B2 | 10/2006 | Landry et al. |
| 7,123,628 B1 | 10/2006 | Hwang |
| 7,124,184 B2 | 10/2006 | Chung et al. |
| 7,137,550 B1 | 11/2006 | Petite |
| 7,142,107 B2 | 11/2006 | Kates |
| 7,143,645 B2 | 12/2006 | Benson et al. |
| 7,228,726 B2 | 6/2007 | Kates |
| 7,248,179 B2 | 7/2007 | Smit |
| 7,248,181 B2 | 7/2007 | Patterson et al. |
| 7,250,874 B2 | 7/2007 | Mueller et al. |
| 7,256,704 B2 | 8/2007 | Yoon et al. |
| 7,263,073 B2 | 8/2007 | Petite et al. |
| 7,267,014 B2 | 9/2007 | Winter |
| 7,272,635 B1 | 9/2007 | Longtin et al. |
| 7,292,143 B2 | 11/2007 | Drake et al. |
| 7,295,128 B2 | 11/2007 | Petite |
| 7,301,456 B2 | 11/2007 | Han |
| 7,304,587 B2 | 12/2007 | Boaz |
| 7,315,257 B2 | 1/2008 | Patterson et al. |
| 7,342,504 B2 | 3/2008 | Crane et al. |
| 7,346,030 B2 | 3/2008 | Cornwall |
| 7,349,766 B2 | 3/2008 | Rodgers |
| 7,353,280 B2 | 4/2008 | Chiles et al. |
| 7,356,614 B2 | 4/2008 | Kim et al. |
| 7,363,031 B1 | 4/2008 | Aisa |
| 7,385,524 B1 | 6/2008 | Orlosky |
| 7,397,907 B2 | 7/2008 | Petite |
| 7,412,882 B2 | 8/2008 | Lazar et al. |
| 7,417,557 B2 | 8/2008 | Osterloh et al. |
| 7,423,985 B1 | 9/2008 | Hill |
| 7,424,527 B2 | 9/2008 | Petite |
| 7,443,313 B2 | 10/2008 | Davis et al. |
| 7,444,401 B1 | 10/2008 | Keyghobad et al. |
| 7,453,373 B2 | 11/2008 | Cumeralto et al. |
| 7,468,661 B2 | 12/2008 | Petite et al. |
| 7,478,108 B2 | 1/2009 | Townsend et al. |
| 7,480,501 B2 | 1/2009 | Petite |
| 7,526,539 B1 | 4/2009 | Hsu |
| 7,533,693 B2 | 5/2009 | Colton et al. |
| 7,549,439 B2 | 6/2009 | Kimura et al. |
| 7,604,216 B2 | 10/2009 | Gebler |
| 7,650,425 B2 | 1/2010 | Davis |
| 7,671,480 B2 | 3/2010 | Pitchford et al. |
| 7,690,393 B2 | 4/2010 | Nagle et al. |
| 7,694,934 B2 | 4/2010 | Irwin |
| 7,696,940 B1 | 4/2010 | MacDonald |
| 7,697,492 B2 | 4/2010 | Petite |
| 7,739,378 B2 | 6/2010 | Petite |
| 7,740,024 B2 | 6/2010 | Brodeur |
| 7,746,246 B2 | 6/2010 | Salser |
| 7,752,309 B2 | 7/2010 | Keyghobad et al. |
| 7,756,086 B2 | 7/2010 | Petite |
| 7,760,703 B2 | 7/2010 | Kubler et al. |
| 7,775,422 B2 | 8/2010 | Winter et al. |
| 7,783,738 B2 | 8/2010 | Keyghobad et al. |
| 7,792,946 B2 | 9/2010 | Keyghobad et al. |
| 7,806,382 B1 | 10/2010 | Palumbo et al. |
| 7,817,063 B2 | 10/2010 | Hawkins et al. |
| 7,825,793 B1 | 11/2010 | Spillman et al. |
| 7,843,379 B2 | 11/2010 | Menzer et al. |
| 7,854,165 B2 | 12/2010 | Ball |
| 7,870,080 B2 | 1/2011 | Budike, Jr. |
| 7,880,641 B2 | 2/2011 | Parris et al. |
| 7,962,101 B2 | 6/2011 | Vaswani et al. |
| 7,980,317 B1 | 7/2011 | Preta et al. |
| 8,014,791 B2 | 9/2011 | Guigne et al. |
| 8,047,072 B2 | 11/2011 | Ball |
| 8,109,131 B2 | 2/2012 | Winter |
| 8,140,667 B2 | 3/2012 | Keyghobad et al. |
| 8,249,042 B2 | 8/2012 | Sparr et al. |
| 8,281,654 B2 | 10/2012 | Ball |
| 8,300,626 B2 | 10/2012 | Thubert et al. |
| 8,351,409 B2 | 1/2013 | Albert et al. |
| 8,391,177 B2 | 3/2013 | Picard |
| 8,407,333 B2 | 3/2013 | Keyghobad |
| 8,549,131 B2 | 10/2013 | Keyghobad et al. |
| 8,660,134 B2 | 2/2014 | Splitz |
| 8,823,509 B2 | 9/2014 | Hyland |
| 8,833,390 B2 | 9/2014 | Ball et al. |
| 8,855,569 B2 | 10/2014 | Splitz |
| 8,931,337 B2 | 1/2015 | Renoud |
| 8,931,505 B2 | 1/2015 | Hyland et al. |
| 9,202,362 B2 | 12/2015 | Hyland |
| 2001/0010032 A1 | 7/2001 | Ehlers et al. |
| 2001/0013488 A1 | 8/2001 | Fukunaga et al. |
| 2001/0024163 A1 | 9/2001 | Petite |
| 2001/0048030 A1 | 12/2001 | Sharood et al. |
| 2002/0013679 A1 | 1/2002 | Petite |
| 2002/0019725 A1 | 2/2002 | Petite |
| 2002/0031101 A1 | 3/2002 | Petite |
| 2002/0051546 A1 | 5/2002 | Bizjak |
| 2002/0062392 A1 | 5/2002 | Nishikawa et al. |
| 2002/0067717 A1 | 6/2002 | Raschke et al. |
| 2002/0073183 A1 | 6/2002 | Yoon et al. |
| 2002/0089802 A1 | 7/2002 | Beckwith |
| 2002/0130768 A1 | 9/2002 | Che et al. |
| 2002/0159434 A1 | 10/2002 | Gosior et al. |
| 2002/0169643 A1 | 11/2002 | Petite et al. |
| 2002/0190956 A1 | 12/2002 | Klein et al. |
| 2003/0009515 A1 | 1/2003 | Lee et al. |
| 2003/0018733 A1 | 1/2003 | Yoon et al. |
| 2003/0018776 A1 | 1/2003 | Yoon et al. |
| 2003/0034900 A1 | 2/2003 | Han |
| 2003/0036810 A1 | 2/2003 | Petite |
| 2003/0046377 A1 | 3/2003 | Daum et al. |
| 2003/0074109 A1 | 4/2003 | Jeong et al. |
| 2003/0076241 A1 | 4/2003 | Middleton |
| 2003/0093484 A1 | 5/2003 | Petite |
| 2003/0107485 A1 | 6/2003 | Zoratti |
| 2003/0174070 A1 | 9/2003 | Garrod et al. |
| 2004/0010561 A1 | 1/2004 | Kim et al. |
| 2004/0054747 A1 | 3/2004 | Breh et al. |
| 2004/0129312 A1 | 7/2004 | Cuzzo et al. |
| 2004/0139210 A1 | 7/2004 | Lee et al. |
| 2004/0158333 A1 | 8/2004 | Ha et al. |
| 2004/0183687 A1 | 9/2004 | Petite et al. |
| 2005/0067022 A1 | 3/2005 | Istre |
| 2005/0072214 A1 | 4/2005 | Cooper |
| 2005/0078631 A1 | 4/2005 | Cornwell |
| 2005/0084418 A1 | 4/2005 | Hill et al. |
| 2005/0096753 A1 | 5/2005 | Arling |
| 2005/0104747 A1 | 5/2005 | Silic et al. |
| 2005/0121880 A1 | 6/2005 | Santangelo |
| 2005/0159823 A1 | 7/2005 | Hayes |
| 2005/0190784 A1 | 9/2005 | Stine |
| 2005/0195768 A1 | 9/2005 | Petite et al. |
| 2005/0195775 A1 | 9/2005 | Petite et al. |
| 2005/0201379 A1 | 9/2005 | Zhang et al. |
| 2005/0201397 A1 | 9/2005 | Petite |
| 2005/0203647 A1 | 9/2005 | Landry et al. |

(56) References Cited

U.S. PATENT DOCUMENTS

| | | |
|---|---|---|
| 2005/0246295 A1 | 11/2005 | Cameron |
| 2005/0251367 A1 | 11/2005 | Kahn et al. |
| 2006/0012491 A1 | 1/2006 | Mahowald |
| 2006/0028355 A1 | 2/2006 | Patterson et al. |
| 2006/0041655 A1 | 2/2006 | Holloway et al. |
| 2006/0046664 A1 | 3/2006 | Paradiso et al. |
| 2006/0098576 A1 | 5/2006 | Brownrigg et al. |
| 2006/0158347 A1 | 7/2006 | Roche et al. |
| 2006/0181414 A1 | 8/2006 | Bandy et al. |
| 2006/0187866 A1 | 8/2006 | Werb |
| 2006/0201550 A1 | 9/2006 | Blyth et al. |
| 2006/0218266 A1 | 9/2006 | Matsumoto et al. |
| 2006/0273896 A1 | 12/2006 | Kates |
| 2006/0284784 A1 | 12/2006 | Smith et al. |
| 2007/0059986 A1 | 3/2007 | Rockwell |
| 2007/0063866 A1 | 3/2007 | Webb |
| 2007/0091825 A1 | 4/2007 | Budampati et al. |
| 2007/0284293 A1 | 12/2007 | Pitchford et al. |
| 2007/0293221 A1 | 12/2007 | Hwang et al. |
| 2007/0298779 A1 | 12/2007 | Wolman et al. |
| 2008/0030319 A1 | 2/2008 | McKenna et al. |
| 2008/0043637 A1* | 2/2008 | Rahman ............... H04L 45/22 370/254 |
| 2008/0061769 A1 | 3/2008 | Junk et al. |
| 2008/0084260 A1 | 4/2008 | Swartzentruber |
| 2008/0086560 A1 | 4/2008 | Monier et al. |
| 2008/0095403 A1 | 4/2008 | Benhammou |
| 2008/0109090 A1 | 5/2008 | Esmaili et al. |
| 2008/0149180 A1 | 6/2008 | Parris et al. |
| 2008/0150750 A1 | 6/2008 | Parris et al. |
| 2008/0169910 A1 | 7/2008 | Greene et al. |
| 2008/0186898 A1 | 8/2008 | Petite |
| 2008/0189056 A1 | 8/2008 | Heidl et al. |
| 2008/0195329 A1 | 8/2008 | Prince et al. |
| 2008/0240078 A1* | 10/2008 | Thubert ............... H04W 40/08 370/351 |
| 2008/0281534 A1 | 11/2008 | Hurley |
| 2008/0291054 A1 | 11/2008 | Groft |
| 2009/0044628 A1 | 2/2009 | Lotscher |
| 2009/0058676 A1 | 3/2009 | Orlosky |
| 2009/0066524 A1 | 3/2009 | Yukawa et al. |
| 2009/0068947 A1 | 3/2009 | Petite |
| 2009/0121860 A1 | 5/2009 | Kimmel et al. |
| 2009/0133887 A1 | 5/2009 | Garcia et al. |
| 2009/0153357 A1 | 6/2009 | Bushman et al. |
| 2009/0188313 A1 | 7/2009 | Ball |
| 2009/0215424 A1 | 8/2009 | Petite |
| 2009/0243840 A1 | 10/2009 | Petite et al. |
| 2009/0255346 A1 | 10/2009 | Hendey et al. |
| 2009/0271045 A1 | 10/2009 | Savelle et al. |
| 2009/0287838 A1 | 11/2009 | Keyghobad et al. |
| 2009/0301571 A1 | 12/2009 | Ruhs |
| 2009/0309755 A1 | 12/2009 | Williamson et al. |
| 2009/0322453 A1 | 12/2009 | Kawaguchi |
| 2010/0017465 A1 | 1/2010 | Brownrigg et al. |
| 2010/0039984 A1 | 2/2010 | Brownrigg |
| 2010/0060479 A1 | 3/2010 | Salter |
| 2010/0097988 A1 | 4/2010 | Chung |
| 2010/0156632 A1 | 6/2010 | Hyland et al. |
| 2010/0194582 A1 | 8/2010 | Petite |
| 2010/0250054 A1 | 9/2010 | Petite |
| 2010/0265909 A1 | 10/2010 | Petite et al. |
| 2010/0295672 A1 | 11/2010 | Hyland et al. |
| 2010/0312881 A1 | 12/2010 | Davis et al. |
| 2010/0329232 A1 | 12/2010 | Tubb et al. |
| 2011/0018762 A1 | 1/2011 | Walley et al. |
| 2011/0030482 A1 | 2/2011 | Meeusen et al. |
| 2011/0044276 A1 | 2/2011 | Albert et al. |
| 2011/0066297 A1 | 3/2011 | Saberi |
| 2011/0079402 A1 | 4/2011 | Darby et al. |
| 2011/0108136 A1 | 5/2011 | Margalit et al. |
| 2011/0140909 A1 | 6/2011 | Olson et al. |
| 2012/0007744 A1 | 1/2012 | Pal et al. |
| 2012/0068476 A1 | 3/2012 | Bradfield |
| 2012/0068477 A1 | 3/2012 | Bradfield |
| 2012/0106518 A1 | 5/2012 | Albert et al. |
| 2012/0271686 A1 | 10/2012 | Silverman |
| 2012/0305084 A1 | 12/2012 | Ball |
| 2013/0064159 A1 | 3/2013 | Edwards |
| 2013/0083722 A1 | 4/2013 | Bhargava et al. |
| 2013/0094537 A1 | 4/2013 | Hui et al. |
| 2013/0107772 A1 | 5/2013 | Splitz et al. |
| 2013/0109319 A1* | 5/2013 | Splitz ............... H04W 16/32 455/63.1 |
| 2013/0181848 A1 | 7/2013 | Picard |
| 2013/0214883 A1 | 8/2013 | Yano |

FOREIGN PATENT DOCUMENTS

| | | |
|---|---|---|
| AU | 2011265675 | 5/2015 |
| AU | 2014259545 | 11/2015 |
| CA | 2476119 | 2/2005 |
| CA | 2650174 | 7/2012 |
| CN | 1185838 | 6/1998 |
| DE | 19757581 | 7/1998 |
| GB | 2305333 | 4/1997 |
| JP | 62-295674 | 12/1987 |
| JP | 05-253316 | 10/1993 |
| JP | 06-223279 | 8/1994 |
| JP | 6300606 | 10/1994 |
| JP | 07-116285 | 5/1995 |
| JP | 07231363 | 8/1995 |
| JP | H10-2744 | 1/1998 |
| JP | H102744 | 1/1998 |
| JP | 11-046254 | 2/1999 |
| JP | H11210028 | 8/1999 |
| JP | 2000131179 | 5/2000 |
| JP | 2000285356 | 10/2000 |
| JP | 2002310840 | 10/2002 |
| JP | 2002352361 | 12/2002 |
| JP | 2005315663 | 11/2005 |
| JP | 2005321935 | 11/2005 |
| JP | 2006062414 | 3/2006 |
| JP | 2006062716 | 3/2006 |
| JP | 2006285645 | 10/2006 |
| JP | 2007047139 | 2/2007 |
| JP | 2008198044 | 8/2008 |
| JP | 2010068017 | 3/2010 |
| JP | 2012507090 | 3/2012 |
| JP | 2012527706 | 11/2012 |
| JP | 2013528732 | 7/2013 |
| JP | H5654124 | 11/2014 |
| WO | 9810299 | 3/1998 |
| WO | 9810394 | 3/1998 |
| WO | 2008087911 | 7/2008 |
| WO | 2009057214 | 5/2009 |
| WO | 2010051287 | 5/2010 |
| WO | 2010135587 | 11/2010 |
| WO | 2011159403 | 12/2011 |

OTHER PUBLICATIONS

Ball, Marty Scott; Issue Notification for U.S. Appl. No. 12/356,240, filed Jan. 20, 2009, mailed Dec. 1, 2010; 1 pg.

Ball, Marty Scott; U.S. Patent Application Entitled: Plastic Water Metwr With Metal Threads under U.S. Appl. No. 12/356,240, filed Jan. 20, 2009; 17 pgs.

Ball, Marty Scott; Issue Notification for U.S. Appl. No. 12/947,272, filed Nov. 16, 2010, mailed Oct. 12, 2011; 1 pg.

Ball, Marty Scott; Non-Final Office Action for U.S. Appl. No. 12/947,272, filed Nov. 16, 2010, mailed May 2, 2011; 11 pgs.

Ball, Marty Scott; Notice of Allowance for U.S. Appl. No. 12/947,272, filed Nov. 16, 2010, mailed Aug. 10, 2011; 5 pgs.

Ball, Marty Scott; U.S. Patent Application Entitled: Plastic Water Meter With Metal Threads under U.S. Appl. No. 12/947,272, filed Nov. 16, 2010; 15 pgs.

Ball, Marty Scott, Notice of Allowance for U.S. Appl. No. 13/220,739, filed Aug. 30, 2011, mailed May 7, 2012; 10 pgs.

Ball, Marty Scott; Issue Notification for U.S. Appl. No. 13/220,739, filed Aug. 30, 2011, mailed Sep. 19, 2012; 1 pg.

(56) References Cited

OTHER PUBLICATIONS

Ball, Marty Scott; Miscellaneous Communication to Applicant for U.S. Appl. No. 13/220,739, filed Aug. 30, 2011; mailed Jun. 14, 2012; 4 pgs.
Ball, Marty Scott; Notice of Allowance for U.S. Appl. No. 13/220,739, filed Aug. 30, 2011, mailed Feb. 17, 2012; 5 pgs.
Ball, Marty Scott; Notice of Allowance for U.S. Appl. No. 13/220,739, filed Aug. 30, 2011, mailed Aug. 23, 2012; 9 pgs.
Ball, Marty Scott; U.S. Patent Application Entitled: Plastic Water Meter With Metal Threads; under U.S. Appl. No. 13/220,739, filed Aug. 30, 2011; 14 pgs.
Ball; Non-Final Office Action for U.S. Appl. No. 13/220,739, filed Aug. 30, 2011, mailed Nov. 15, 2011, 7 pgs.
Ball, Marty Scott; Non-Final Office Action for U.S. Appl. No. 13/646,892, filed Oct. 8, 2012, mailed Jun. 7, 2013; 10 pgs.
Ball, Marty Scott; Notice of Allowance for U.S. Appl. No. 13/646,892, filed Oct. 8, 2012, mailed Sep. 17, 2013, 6 pgs.
Ball, Marty Scott; U.S. Continuation Application entitled: Non-Metallic Enclusure With Metal Threads, U.S. Appl. No. 13/646,892, filed Oct. 8, 2012, 14 pgs.
Hyland, Gregory E.; Issue Notification for U.S. Appl. No. 12/606,957, filed Oct. 27, 2009, mailed Nov. 11, 2015, 1 pg.
Hyland, Gregory E.; Supplemental Notice of Allowability for U.S. Appl. No. 12/606,957, filed Oct. 27, 2009, mailed Oct. 13, 2015, 4 pgs.
Hyland, Gregory E.; U.S. Continuation Application entitled: Infrastructure Monitoring System and Method having U.S. Appl. No. 14/928,725, filed Oct. 30, 2015, 28 pgs.
Ball, Marty Scott, Office Action from Canadian Intellectual Property Office for Application No. 2,650,174, filed Jan. 19, 2009, mailed Sep. 8, 2011, 3 pgs.
Ball, Marty Scott, Office Action from Canadian Intellectual Property Office for serial No. 2,650,174, filed Jan. 19, 2009, mailed Dec. 7, 2010; 2 pages.
Ball, Marty Scott; Canadian Office Action for serial No. 2,777,585, filed Jan. 19, 2009, mailed Oct. 21, 2013, 2 pgs.
Hyland, Gregory E.; Australian Patent Examination report for serial No. 2015202223, filed May 20, 2010, mailed Nov. 4, 2015, 4 pgs.
Hyland, Gregory E.; Japanese Office Action for serial No. 2014-234642, filed May 5, 2011, mailed Nov. 4, 2015,9 pgs.
Ball, Marty Scott; U.S. Provisional Patent Application Entitled: Plastic Water Meter, under U.S. Appl. No. 61/022,088, filed Jan. 18, 2008, 10 pgs.
McCraven, Jeremy; Non-Final Office Action for U.S. Appl. No. 14/273,823, filed May 9, 2014, mailed Dec. 8, 2015, 18 pgs.
McCraven, Jeremy; U.S. Patent Application Entitled: Mechanical Stop for Actuator and Orifice, U.S. Appl. No. 14/73,823, filed May 9, 2014, 40 pgs.
Dukes, Brent; International Search Report and Written Opinion for application No. PCT/US15/44140, filed Aug. 7, 2015, mailed Dec. 30, 2015, 15 pgs.
Article entitled, "GF Piping Systems' New Metal-to-Plastic Transition Fittings Provide Strong, Leak-Proof Seals", Nov. 13, 2007, pp. 1-6; http://news.thomasnet.com/fullstory/536342.
Brochure entitled, "DoubleSafe tm Transition Fillings from GF Piping Systems" Georg Fischer Piping Systems; date unknown when published: accessed on Oct. 1, 2008; pp. 1-2 http://www.us.piping.georgefischer.com/go/F017C7DA19993E1D340739AFBC4B677E?action=GF_Docu.
Brochure entitled, "Polyrac and Polyfast", date unknown when published; accessed on Jun. 1, 2009; pp. 1-8; http://www.cn.piping.georgfischer.com/doc/doc_download.cfm?B81010EAD6OEB5F06E54F6B04231161F.
Brochure entitled, "Section 1, Schedule 80 PVC Piping System," Mar. 27, 2006, pp. 1.1-1.32; http://web.archive.org/web/20060816045129/http://www.gfpiping.com/downloads/vinyls/01-Sch80PVC.pdf.
Brochure entitled, "Section 2, Schedule 80 CPVC Piping System," Mar. 27, 2006, pp. 2.1-2.28; http://web.archive.org/web/20060816045129/http://www.gfpiping.com/downloads/vinyls/02-Sch80CPVC.pdf.
Brochure entitled, "The World Needs Solutions, We Have Them!," date unknown when published' accessed on Oct. 1, 2008; pp. 1-12; http://www.plasticsystems.co.nz/booklets/Civil%20Infrastructure/+GF+%20Utilities%20Brochure.pdf.
Brochure entitled, "Transition Fittings, Strong and Reliable Metal-to-Plastic Transitions", BR-2-0305; date unknown when published; accessed on Oct. 1, 2008; pp. 1-2 http://plascowelding.com/pdf2007/PVC&CPVCPipeandFittings/Thermoplastic-Fittings/PVC&CPVC-Metal.
Hyland, Gregory E.; Canadian Office Action for serial No. 2,741,843, filed Oct. 27, 2009, mailed Dec. 8, 2015, 5 pgs.
Splitz, David; PCT Application entitled: Systems and Methods for Dynamic Squelching in Radio Frequency Devices having serial No. PCT/US12/022060, filed Jan. 20, 2012, 50 pgs.
Splitz, David; International Preliminary Report on Patentability for serial No. PCT/US12/22060, filed Jan. 20, 2012, mailed May 8, 2014, 6 pgs.
Splitz, David Edwin; U.S. Provisional Patent Application entitled: Automatic Discovery of Nodes in a Mesh Network, U.S. Appl. No. 61/779,892, filed Mar. 13, 2013; 110 pgs.
Hyland, Gregory E.; Non-Final Office Action for U.S. Appl. No. 14/557,754, filed Dec. 2, 2014, mailed Jan. 19, 2016, 101 pgs.
Hyland; European Examination Report for serial No. EP09824079.9, filed Oct. 27, 2009, mailed Nov. 13, 2015; 6 pgs.
McCraven, Jeremy; Applicant Interview Summary for U.S. Appl. No. 14/273,823, filed May 9, 2014, mailed Jan. 12, 2016, 3 pgs.
Hyland, Gregory E.; Non-Final Office Action for U.S. Appl. No. 12/606,957, filed Oct. 27, 2009, mailed Apr. 16, 2015, 47 pgs.
Ball, Marty Scott; Mexico Office Action for serial No. MX/a/2012/00609, filed May 25, 2012, mailed Mar. 19, 2015, 3 pgs.
Splitz, David Edwin; Extended European Search Report for serial No. 12844451.0, filed Jan. 20, 2012, mailed Apr. 21, 2015, 8 pgs.
Ball, Marty Scott; Non-Final Office Action for U.S. Appl. No. 14/451,896, filed Aug. 5, 2014, mailed Mar. 18, 2016, 98 pgs.
Hyland, Gregory E.; Non-Final Office Action for U.S. Appl. No. 14/450,452, filed Aug. 4, 2014, mailed Feb. 17, 2016, 98 pgs.
Hyland, Gregory; Non-Final Office Action for U.S. Appl. No. 14/848,676, filed Sep. 9, 2015, mailed Mar. 4, 2016, 94 pgs.
McCraven, Jeremy; Non-Final Office Action for U.S. Appl. No. 14/273,823, filed May 9, 2014, mailed Apr. 12, 2016, 86 pgs.
Ball, Marty Scott; Mexico Office Action for serial No. MX/a/2012/00609, filed May 25, 2012, mailed May 26, 2015, 5 pgs.
Hyland, Gregory E.; Australian Examination Report for serial No. 2014259545, filed Oct. 27, 2009, mailed Jun. 10, 2015; 2 pgs.
Hyland, Gregory E.; Japanese Office Action for serial No. 2014-234642, filed May 5, 2011, mailed Jul. 7, 2015, 9 pgs.
Hyland, Gregory E.; Notice of Allowance for U.S. Appl. No. 12/606,957, filed Oct. 27, 2009, mailed Jul. 27, 2015, 19 pgs.
Hyland, Gregory; U.S. Continuation Application entitled: Infrastructure Monitoring Devices, Systems, and Methods having U.S. Appl. No. 14/848,676, filed Sep. 9, 2015, 29 pgs.
Dukes, Brent; PCT Application entitled: Dunamic Ruoting in a Mesh Network having serial No. PCT/US15/44140, filed Aug. 7, 2015, 41 pgs.
Ball, Marty Scott; Issue Notification for U.S. Appl. No. 13/149,720, filed May 31, 2011, mailed Aug. 27, 2014, 1 pg.
Ball, Marty Scott; Non-Final Office Action for U.S. Appl. No. 13/149,720, filed May 31, 2011, mailed Mar. 11, 2014, 75 pgs.
U.S. Application Ball, Marty Scott; Notice of Allowance for U.S. Appl. No. 13/149,720, filed May 31, 2011, mailed Jun. 24, 2014, 29 pgs.
Ball, Marty Scott; Supplemental Notice of Allowability for U.S. Appl. No. 13/149,720, filed May 31, 2011, mailed Aug. 12, 2014, 4 pgs.
Ball, Marty Scott; U.S. Patent Application Entitled: Valve Meter Assembly and Method under U.S. Appl. No. 13/149,720, filed May 31, 2011; 56 pgs.

(56) References Cited

OTHER PUBLICATIONS

Ball, Marty Scott; U.S. Patent Application Entitled: Valve Meter Assembly and Method, U.S. Appl. No. 14/451,896, filed Aug. 5, 2014; 56 pgs.
Hyland, Gregory E.; Applicant Initiated Interview Summary for U.S. Appl. No. 12/606,957, filed Oct. 27, 2009, mailed Feb. 18, 2014, 4 pgs.
Hyland, Gregory E.; Final Office Action for U.S. Appl. No. 12/606,957, filed Oct. 27, 2009, mailed Dec. 17, 2013, 54 pgs.
Hyland, Gregory E.; Final Office Action for U.S. Appl. No. 12/606,957, filed Oct. 27, 2009, mailed Apr. 10, 2013, 80 pgs.
Hyland, Gregory E.; Final Office Action for U.S. Appl. No. 12/606,957, filed Oct. 27, 2009, mailed Sep. 22, 2014, 49 pgs.
Hyland, Gregory E.; Non-Final Office Action for U.S. Appl. No. 12/606,957, filed Oct. 27, 2009, mailed Oct. 18, 2012; 44 pgs.
Hyland, Gregory E.; Non-Final Office Action for U.S. Appl. No. 12/606,957, filed Oct. 27, 2009, mailed Apr. 8, 2014, 43 pgs.
Hyland, Gregory E.; Non-Final Office Action for U.S. Appl. No. 12/606,957, filed Oct. 27, 2009, mailed Sep. 6, 2013; 53 pgs.
Hyland; U.S. Patent Application entitled: Infrastructure Monitoring System and Method, having U.S. Appl. No. 12/606,957, filed Oct. 27, 2009, 30 pgs.
Hyland, Gregory E.; Final Office Action for U.S. Appl. No. 12/784,300, filed May 20, 2010, mailed Feb. 11, 2014; 37 pgs.
Hyland, Gregory E.; Final Office Action for U.S. Appl. No. 12/784,300, filed May 20, 2010, mailed May 29, 2013, 71 pgs.
Hyland, Gregory E.; Issue Notification for U.S. Appl. No. 12/784,300, filed May 20, 2010, mailed Aug. 13, 2014. 1 pg.
Hyland, Gregory E.; Non-Final Office Action for U.S. Appl. No. 12/784,300, filed May 20, 2010, mailed Sep. 10, 2012, 35 pgs.
Hyland, Gregory E.; Notice of Allowance for U.S. Appl. No. 12/784,300, filed May 20, 2010, mailed Apr. 23, 2014, 20 pgs.
Hyland, Gregory E.; Supplemental Notice of Allowability for U.S. Appl. No. 12/784,300, filed May 20, 2010, mailed Aug. 1, 2014, 4 pgs.
Hyland; U.S. Application entitled: Infrastructure Monitoring Devices, Systems, and Methods, having U.S. Appl. No. 12/784,300, filed May 20, 2010, 32 pgs.
Hyland, Gregory E.; U.S. Continuation Application entitled: Infrastructure Monitoring Devices, Systems, and Methods, having U.S. Appl. No. 14/450,452, filed Aug. 4, 2014, 32 pgs.
Keyghobad, Seyamak; Issue Notification for U.S. Appl. No. 10/298,300, filed Nov. 18, 2002, mailed Oct. 8, 2008; 1 pg.
Keyghobad, Seyamak; Requirement for Restriction/ Election for U.S. Appl. No. 10/298,300; filed Nov. 18, 2002; mailed Feb. 9, 2006; 11 pages.
Keyghobad, Seyamak; Issue Notification for U.S. Appl. No. 12/243,452 filed Oct. 1, 2008 mailed Jun. 16, 2010; 1 pg.
Keyghobad, Seyamak; Issue Notification for U.S. Appl. No. 12/490,867, filed Jun. 24, 2009, mailed Feb. 29, 2012; 1 p.
Keyghobad, Seyamak; Non Final Rejection for U.S. Appl. No. 12/490,867, filed Jun. 24, 2009, mailed Mar. 21, 2011; 9 pgs.
Keyghobad, Seyamak; Non Final Rejection for U.S. Appl. No. 12/490,867, filed Jun. 24, 2009, mailed Oct. 4, 2010; 13 pgs.
Keyghobad, Seyamak; Notice of Allowance for U.S. Appl. No. 12/490,867 filed Jun. 24, 2006, mailed Sep. 7, 2011; 6 pgs.
Keyghobad, Seyamak; Notice of Allowance for U.S. Appl. No. 12/490,867, filed Jun. 24, 2009, mailed Nov. 2, 2011; 17 pgs.
Keyghobad, Seyamak; U.S. Patent Application Entitled: Method and Apparatus for Inexpensively Monitoring and Controlling Remotely Distributed Appliances under U.S. Appl. No. 12/490,867, filed Jun. 24, 2009; 33 pgs.
Keyghobad, Seyamak; Issue Notification for U.S. Appl. No. 12/490,925 filed Jun. 24, 2009; mailed Aug. 18, 2010; 1 pg.
Keyghobad, Seyamak; Non-final office action for U.S. Appl. No. 12/490,925, filed Jun. 24, 2009; mailed Dec. 23, 2009; 17 pgs.
Keyghobad, Seyamak; Notice of Allowance for U.S. Appl. No. 12/490,925, filed Jun. 24, 2009, mailed Aug. 2, 2010; 8 pgs.
Keyghobad, Seyamak; Issue Notification for U.S. Appl. No. 12/490,957, filed Jun. 24, 2009, mailed Aug. 4, 2010; 1 pg.
Keyghobad, Seyamak; U.S. Patent Application Entitled: Method and Apparatus for Inexpensively Monitoring and Controlling Remotely Distributed Appliances under U.S. Appl. No. 12/490,957, filed Jun. 24, 2009; 33 pgs.
Keyghobad, Seyamak; Issue Notification for U.S. Appl. No. 13/372,408, filed Feb. 13, 2012, mailed Mar. 6, 2013, 1 pg.
Keyghobad, Seyamak; Non-final Office Action for U.S. Appl. No. 13/372,408, filed Feb. 23, 2012; mailed May 25, 2012; 17 pgs.
Keyghobad, Seyamak; Notice of Allowance for U.S. Appl. No. 13/372,408, filed Feb. 13, 2012, mailed Jul. 27, 2012; 11 pgs.
Keyghobad, Seyamak; Notice of Allowance for U.S. Appl. No. 13/372,408, filed Feb. 13, 2012; mailed Nov. 1, 2012; 18 pgs.
Keyghobad, Seyamak; Supplemental Notice of Allowance for U.S. Appl. No. 13/372,408, filed Feb. 13, 2012; mailed Aug. 2, 2012; 7 pgs.
Keyghobad, Seyamak; U.S. Patent Application Entitled: Method and Apparatus for Inexpensively Monitoring and Controlling Remotely Distributed Appliances under U.S. Appl. No. 13/372,408, filed Feb. 13, 2012; 34 pgs.
Keyghobad, Seyamak, Issue Notification for U.S. Appl. No. 13/590,954, filed Aug. 21, 2012, mailed Sep. 11, 2013, 1 pg.
Keyghobad, Seyamak; Non-Final Office Action for U.S. Appl. No. 13/590,954, filed Aug. 21, 2012, mailed Dec. 13, 2012; 39 pgs.
Keyghobad, Seyamak; Notice of Allowance for U.S. Appl. No. 13/590,954, filed Aug. 21, 2012, mailed Mar. 21, 2013, 22 pgs.
Keyghobad, Seyamak; Notice of Allowance for U.S. Appl. No. 13/590,954, filed Aug. 21, 2012, mailed Jul. 9, 2013, 21 pgs.
Keyghobad, Seyamak; U.S. Patent Application entitled: Method and Apparatus for Inexpensively Monitoring and Controlling Remotely Distributed Appliances for U.S. Appl. No. 13/590,954, filed Aug. 21, 2012, 35 pgs.
Hyland, Gregory E., Non-Final Office Action for U.S. Appl. No. 13/101,235, filed May 5, 2011, mailed Jul. 31, 2013; 57 pgs.
Hyland, Gregory E.; Final Office Action for U.S. Appl. No. 13/101,235, filed May 5, 2011, mailed Feb. 20, 2014; 29 pgs.
Hyland, Gregory E.; Non-Final Office Action for U.S. Appl. No. 12/784,300, filed May 20, 2010, mailed Sep. 24, 2013; 37 pgs.
Vonroll Hydro—Hydrojournal, pp. 1-16, May 2008.
English Translation: Vonroll Hydro—Hyrdojournal, Technology with a Future for Shut-off Systems—p. 4, VonRoll Hydro (shop) GmbH—New Concepts for Apprentice Training—p. 12, May 2008.
Von Roll Hydro—Hydrojournal, pp. 1-16, Nov. 2008.
English Translation: Von Roll Hydro—Hyrdojournal,VonRoll Hydroalert—Provides a Warning in the Event of Any Tampering with the Water Supply, p. 3, Nov. 2008.
Keyghobad, Seyamak; Examiner Interview Summary Record for U.S. Appl. No. 10/298,300, filed Nov. 18, 2002; mailed Feb. 5, 2008; 2 pages.
Keyghobad, Seyamak; Non-Final Rejection for U.S. Appl. No. 10/298,300, filed Nov. 18, 2002; mailed Oct. 26, 2007; 35 pages.
Keyghobad, Seyamak; Requirement for Restriction/ Election for U.S. Appl. No. 10/298,300, filed Nov. 18, 2002; mailed Feb. 27, 2006; 17 pages.
Keyghobad,Seyamak; U.S. Patent Application entitled: Method and Apparatus for Inexpensively Monitoring and Controlling Remotely Distributed Appliances under U.S. Appl. No. 10/298,300, filed Nov. 18, 2002; 40 pages.
Keyghobad, Seyamak; Non-Final Rejection for U.S. Appl. No. 10/298,300, filed Nov. 18, 2002; mailed May 18, 2006; 13 pages.
Keyghobad, Seyamak; Non-Final Rejection or U.S. Appl. No. 10/298,300, filed Nov. 18, 2002; mailed Jun. 6, 2007; 32 pages.
Keyghobad, Seyamak; Certificate of Correction for U.S. Appl. No. 10/298,300, filed Nov. 18, 2002; mailed Mar. 31, 2009; 1 page.
Keyghobad, Seyamak; Notice of Allowance for U.S. Appl. No. 10/298,300, filed Nov. 18, 2002; mailed Jul. 14, 2008; 4 pages.
Keyghobad, Seyamak; Notice of Allowance for U.S. Appl. No. 12/243,452, filed Oct. 1, 2008; mailed Mar. 22, 2010; 8 pages.
Keyghobad, Seyamak; Examiner Interview Summary Record for U.S. Appl. No. 12/243,452, filed Oct. 1, 2008; mailed Dec. 7, 2009; 3 pages.
Keyghobad, Seyamak; Non-Final Rejection for U.S. Appl. No. 12/243,452, filed Oct. 1, 2008; mailed Sep. 14, 2009; 12 pages.

(56) References Cited

OTHER PUBLICATIONS

Keyghobad, Seyamak; Non-Final Rejection for U.S. Appl. No. 12/243,452, filed Oct. 1, 2008; mailed May 1, 2009; 5 pages.
Keyghobad, Seyamak; U.S. Patent Application Entitled: Method and Apparatus for Inexpensively Monitoring and Controlling Remotely Distributed Appliancesl under U.S. Appl. No. 12/243,452, filed Oct. 1, 2008; 33 pages.
Keyghobad, Seyamak; Notice of Allowance for U.S. Appl. No. 12/490,925, filed Jun. 24, 2009; mailed Jul. 19, 2010; 8 pages.
Keyghobad, Seyamak; Notice of Allowance for U.S. Appl. No. 12/490,925, filed Jun. 24, 2009; mailed Jun. 28, 2010; 10 pgs.
Keyghobad, Seyamak; U.S. Patent Application Entitled: Method and Apparatus for Inexpensively Monitoring and Controlling Remotely Distributed Appliances under U.S. Appl. No. 12/490,925, filed Jun. 24, 2009; 33 pgs.
Keyghobad, Seyamak; Notice of Allowance for U.S. Appl. No. 12/490,957, filed Jun. 24, 2009; mailed Jun. 24, 2010; 10 pgs.
Keyghobad, Seyamak; Non-Final Rejection for U.S. Appl. No. 12/490,957, filed Jun. 24, 2009; mailed Dec. 23, 2009; 17 pgs.
Young et al. "Real-Time Intranet-Controlled Virtual Instrument Multiple-Circuit Power Monitoring," IEEE Transactions on Instrumentation and Measurement, Jun. 2000. vol. 49, No. 3, p. 570. [Accessed Dec. 29, 2011] http://ieeexplore.ieee.org/xpls/abs_all.jsp?
De Almeida et al. "Advanced Monitoring Technologies for the Evaluation of Demand-Side Management Programs," IEEE Transactions on Power Systems, Aug. 1994. vol. 9, No. 3. [Accessed Dec. 29, 2011] http://ieeexplore.ieee.org/xpls/abs_all.jsp?arnumber=336086.
Dolezilek. "Microprocessor Based Relay Information Improves the Power System," Rural Electric Power Conference, May 1999. p. B5/1-B5/9. [Accessed Dec. 29, 2011] http://ieeexplore.ieee.org/xpls/abs_all.jsp?arnumber=768685.
Gehami et al. "Electronic Control System I Salient Feature in Substation," Transmission & Distrubition, Mar. 1991. vol. 43, No. 3, p. 48. [Accessed Dec. 29, 2011—ProQuest].
Horlent. "New Metering and Reading Techniques Based on a Modular Design Concept," 10th International Conference on Electricity Distribution, May 1989. vol. 5, p. 455-459. [Accessed Dec. 29, 2011—IEEExplore].
"In Brief," Land Mobile Radio News, Jan. 16, 1998. vol. 52, No. 3, p. 1. [Accessed Dec. 29, 2011—ProQuest] http://proquest.umi.com/pqdweb?did=25435781&sid=1&Fmt=3&clientId=31810&RQT=309&VName%20=PQD.
"Landis & Gyr Utilities: Service Partnership Helps Utilities Use Available Resources More Effectively," www.landisgyr.com/utilities/e/fr_press1_e.htm (archived Feb. 6, 1998) http://web.archive.org/web/19980206060801/http://www.landisgyr.com/utilities.
Tamarkin. "Automated Meter Reading", Sep.-Oct. 1992, vol. 50, No. 5/ [Accessed Dec. 29, 2011] http://www.uscicorp.com/news/Automatic_Power_reading.pdf.
ANSI; "Protocol Specification for ANSI Type 2 Optical Port", American National Standard, ANSI C.Dec. 18, 2006, 11 pgs.
Federal Communications Commission; "Understanding the FCC Regulations for Low-Power, Non-Licensed Transmitters", Office of Engineering and Technology; Oct. 1993; 34 pgs.
SEMTECH; "TN1200.4, Calculating Radiated Power and Field Strength for Conducted Power Measurements", Semtech Corporation, Camarillo, CA, 2007, 9 pgs.
RFM; "HX 2000 Datasheet: 916.5 MHz: Hybrid Transmitter", RF Monolithics, Inc., Dallas, TX, USA, 1998; 2 pgs.
General Electric; "GEH-5081 kV Meter Product Manual", Nov. 1997, 137 pgs.
General Electric; "kV RSX—RS232/RS485 Communications Options: Instructions Manual"; Mar. 1999, 33 pgs.
Orfield; "Badger® Orion® System Helps Lemmon, South Dakota Reduce Read Time, Billing Cycles", Badger Connect Publication, 2004, 2 pgs.
AMCO; "Pit Water-Meter Transponder (PWT)"; AMCO Automated Systems, LLC; PDB-14611; Sep. 2002; 2 pgs.
AMCO; "Short-Range Programmer (SRP) VRT"; AMCO Automated Systems, LLC; PDB-14555.1; Sep. 2002; 2 pgs.
AMCO; Remote Water-Meter Transponder (RWT); AMCO Automated Systems, LLC; PDB-14610; Sep. 2002; 2 pgs.
Article entitled: "Remote Meter Reading", http://www.meter.co.uk/RMR.html; accessed on Jul. 30, 2012, 2 pgs.
Article entitled: "Datamatic, Badger Connect for AMR Solutions", http://www.datamatic.com/badger_partnership.html; accessed on Jul. 27, 2012, 1 pg.
Article entitled: "OET Exhibits List", https://apps.fcc.gov/oetcf/eas/reports/ViewExhibitReport.cfm?mode=Exhibits&Request-Timeout=500&calledFromFrame=N&application_id=194044&fcc_id=; 2 pgs.
Patterson, Tim; Request for Ex Parte Reexamination under U.S. Appl. No. 90/012,468, filed Sep. 6, 2012; 52 pgs.
Patterson, Tim; Request for Ex Parte Reexamination under U.S. Appl. No. 90/012,449, filed Aug. 23, 2012; 51 pgs.
Radix Corporation; "Automatic Meter Reading", 2 pgs.
Transparent Techcnologies; "Model M1A: Utility Radio Transmitter; M1A Operating Instructions"; 7 pgs.
Trace; "Pit Water—Meter Transponder"; User Guide; Jan. 2003 16 pgs.
Hyland; U.S. Patent Application Entitled: Infrastructure Monitoring Devices, Systems and Methods under U.S. Appl. No. 13/101,235, filed May 5, 2011; 28 pgs.
Hyland, Gregory E.; Non-Final Office Action for U.S. Appl. No. 13/101,235, filed May 5, 2011, mailed Jun. 5, 2014, 29 pgs.
Antenna. Merriam-Webster Dictionary, 2014 [retrieved on Jun. 1, 2014]. Retrieved from the Internet: <URL: www.merriam-webster.com/dictionary/antenna>.
Hyland, Gregory E.; Notice of Allowance for U.S. Appl. No. 13/101,235, filed May 5, 2011, mailed Sep. 11, 2014, 11 pgs.
Hyland; PCT Application entitled: Infrastructure Monitoring System and Method having serial No. PCT/US09/62247, filed Oct. 27, 2009, 30 pgs.
Hyland; International Preliminary Report on Patentability for serial No. PCT/US2009/062247, filed Oct. 27, 2009, mailed May 3, 2011, 7 pgs.
International Search Report for serial No. PCT/US2009/062247, filed on Oct. 27, 2009, mailed Dec. 18, 2009, 2 pgs.
Hyland, Gregory;Mexico Office Action for serial No. MX/a/2011/004330, filed Apr. 25, 2011, mailed Mar. 21, 2013, 7 pgs.
Hyland, Gregory; Mexico Office Action for serial No. MX/a/2011/004330, filed Apr. 25, 2011, mailed Jul. 18, 2013, 6 pgs.
Hyland, Gregory; Mexico Office Action for serial No. MX/a/2011/004330, filed Apr. 25, 2011, mailed Oct. 3, 2013, 6 pgs.
Hyland; European Search Report for serial No. EP09824079.9, filed Oct. 27, 2009, mailed May 8, 2012; 38 pages.
Hyland, Gregory; Australian Patent Examination Report for serial No. 2009308949, filed Oct. 27, 2009, mailed Nov. 12, 2013, 3 pgs.
Japanese Office Action for serial No. 2011-533427, filed Oct. 27, 2009, mailed Apr. 30, 2013, 15 pgs.
Hyland, Gregory E.; Japanese Office Action for serial No. 2011-533427, filed Oct. 27, 2009, mailed Feb. 4, 2014, 50 pgs.
Hyland, Gregory E.; Decision of Rejection for Japanese serial No. 2011-533427, filed Oct. 27, 2009, mailed Sep. 16, 2014, 4 pgs.
Hyland; PCT Appplication entitled: Infrastructure Monitoring Devices, Systems, and Methods having serial No. PCT/US2010/035666, filed May 20, 2010; 31 pgs.
Hyland; International Search Report and Written Opinion for serial No. PCT/US2010/035666, filed May 20, 2010, mailed Jul. 16, 2010, 7 pgs.
Hyland; International Preliminary Report on Patentability for serial No. PCT/US2010/035666, filed May 20, 2010, mailed Nov. 22, 2011, 6 pgs.
Mexico Office Action for serial No. MX/A/2011/012383, filed May 20, 2010, mailed Oct. 8, 2012, 3 pgs.
Mexico Office Action for serial No. MX/a/2011/012383, filed May 20, 2010, mailed May 9, 2013, 8 pgs.
Mexico Office Action for serial No. MX/A/2011/012383, filed May 20, 2010, mailed Sep. 3, 2013, 10 pgs.
Hyland, Gregory E.; Mexico Final Office Action for serial No. MX/A/2011/012383, filed May 20, 2010, mailed Jan. 9, 2014, 9 pgs.

(56) References Cited

OTHER PUBLICATIONS

European Search Report for serial No. EP2433440, filed Nov. 18, 2011, mailed Nov. 21, 2012, 6 pgs.
Hyland, Gregory E.; Australian Patent Examination report for serial No. 2010249499, filed Nov. 17, 2011, mailed Jun. 16, 2014, 5 pgs.
Hyland, Gregory; Decision of Rejection for Japanese serial No. 2012-512048, filed May 20, 2010, mailed Apr. 22, 2014, 10 pgs.
Hyland, Gregory; Mexico Office Action for serial No. MX/a/2012/015236, filed Dec. 19, 2012, mailed Jun. 13, 2013, 4 pgs.
Hyland, Gregory; Mexico Office Action for serial No. MX/a/2012/015236, filed Dec. 19, 2012, mailed Oct. 3, 2013, 8 pgs.
Hyland, Gregory; Mexico Office Action for serial No. MX/a/2012/015236, filed Dec. 19, 2012, mailed Dec. 3, 2013, received by foreign associate on Jan. 9, 2014, 4 pgs.
Hyland; International Search Report and Written Opinion for serial No. PCT/US2011/035374, filed May 5, 2011, mailed Sep. 13, 2011; 7 pgs.
Hyland; PCT Application Entitled: Infrastructure Monitoring Devices, Systems, and Methods having serial No. PCT/US11/35374, filed May 5, 2011, 28 pgs.
Hyland; International Preliminary Report on Patentability for serial No. PCT/US2011/035374, filed May 5, 2011, mailed Dec. 19, 2012; 5 pgs.
Hyland, Gregory E.; Australian Patent Examination Report for serial No. 2011265675, filed Jan. 21, 2012, mailed Oct. 1, 2014, 3 pgs.
Hyland, Gregory E.; Japanese Office Action for serial No. 2013515338, filed Jan. 30, 2012, mailed Jun. 10, 2014, 8 pgs.
Hyland; U.S. Provisional Patent Application entitled: Water Supply Infrastructure Monitoring System and Method, having U.S. Appl. No. 61/108,770, filed Oct. 27, 2008, 11 pgs.
Hyland; U.S. Provisional Patent Application entitled: Water Supply Infrastructure Monitoring System and Method, having U.S. Appl. No. 61/180,600, filed May 22, 2009, 14 pgs.
Hyland; U.S. Provisional Patent Application entitled: Infrastructure Monitoring Devices, Systems, and Methods, having U.S. Appl. No. 61/355,468, filed Jun. 16, 2010; 31 pgs.
Splitz, David. E.; U.S. Patent Application Entitled: Systems and Methods for Time-Based Hailing of Radio Frequency Devices assigned U.S. Appl. No. 13/283,526, filed Oct. 27, 2011, 51 pages.
Splitz, David Edwin; Non-Final Office Action for U.S. Appl. No. 13/283,526, filed Oct. 27, 2011, mailed Jun. 18, 2013, 67 pgs.
Splitz, David Edwin; Notice of Allowance for U.S. Appl. No. 13/283,526, filed Oct. 27, 2011, mailed Oct. 9, 2013, 16 pgs.
Splitz, David Edwin; Issue Notification for U.S. Appl. No. 13/283,526, filed Oct. 27, 2011, mailed Feb. 5, 2014, 1 pg.
Splitz, David E.; U.S. Patent Application Entitled: Systems and Methods for Dynamic Squelching in Radio Frequency Devices assigned U.S. Appl. No. 13/339,655, filed Dec. 29, 2011; 50 pgs.
(Splitz, David Edwin; Non-Final Office Action for U.S. Appl. No. 13/339,655, filed Dec. 29, 2011, mailed Sep. 16, 2013, 57 pgs.
Splitz, David Edwin; Non-Final Office Action for U.S. Appl. No. 13/339,655, filed Dec. 29, 2011, mailed Mar. 5, 2014, 18 pgs.
Splitz, David Edwin; Notice of Allowance for U.S. Appl. No. 13/339,655, filed Dec. 29, 2011, mailed May 23, 2014, 41 pgs.
Splitz, David Edwin; Issue Notification for U.S. Appl. No. 13/339,655, filed Dec. 29, 2011, mailed Sep. 17, 2014, 1 pg.
Splitz, David Edwin; U.S. Patent Application entitled: Systems and Methods for Recovering an Out-Of-Service Node in a Hierarchical Network, U.S. Appl. No. 14/490,081, filed Sep. 18, 2014, 51 pgs.
Splitz, David; International Search Report and Written Opinion for serial No. PCT/US11/58260, filed Oct. 28, 2011, mailed Feb. 7, 2012, 8 pgs.
Splitz, David; PCT Application entitled: Systems and Methods for Time-Based Flailing of Radio Frequency having serial No. PCT/US11/058260, filed Oct. 28, 2011, 51 pgs.
Splitz, David; International Preliminary Report on Patentability for serial No. PCT/US11/58260, filed Oct. 28, 2011, mailed May 8, 2014, 7 pgs.
Splitz, David; International Search Report and Written Opinion for serial No. PCT/US12/22060, filed Jan. 20, 2012, mailed Mar. 29, 2012, 8 pgs.
Hyland, Gregory; Japanese Office Action for serial No. 2012-512048, filed May 20, 2010, mailed Oct. 22, 2013, 51 pgs.
Hyland, Gregory E.; Issue Notification for U.S. Appl. No. 13/101,235, filed May 5, 2011, mailed Dec. 23, 2014, 1 pg.
Hyland, Gregory E.; Supplemental Notice of Allowability for U.S. Appl. No. 13/101,235, filed May 5, 2011, mailed Nov. 25, 2014, 5 pgs.
Hyland, Gregory E.; U.S. Patent Application entitled: Infrastructure Monitoring Devices, Systems, and Methods having U.S. Appl. No. 14/557,754, filed Dec. 2, 2014, 28 pgs.
Hyland, Gregory E.; Australian Patent Examination report for serial No. 2010249499, filed Nov. 17, 2011, mailed Nov. 21, 2014, 5 pgs.
Cullinan, Thomas; U.S. Patent Application entitled: SMS Communication for Cellular Node, having U.S. Appl. No. 15/098,986, filed Apr. 14, 2016, 26 pgs.
Grady, Robert Henry; U.S. Patent Application entitled: Time Beacons having U.S. Appl. No. 15/065,423, filed Mar. 9, 2016, 34 pgs.
Splitz, David Edwin; U.S. Patent Application entitled: Asymmetrical Hail Timing, having U.S. Appl. No. 15/206,851, filed Jul. 11, 2016, 33 pgs.
Splitz, David Edwin; U.S. Patent Application entitled: Node Migration, having U.S. Appl. No. 15/161,448, filed May 23, 2016, 30 pgs.
Ball, Marty Scott; Non-Final Office Action for US. Appl. No. 14/451,896; filed Aug. 5, 2014, mailed May 12, 2016; 15 pages.
Hyland, Gregory E.; Final Office Action for U.S. Appl. No. 14/557,754, filed Dec. 2, 2014, mailed Mar. 30, 2016, 24 pgs.
Hyland, Gregory E.; Mexico Office Action for serial No. MX/a/2012/000347, filed May 5, 2011, mailed May 30, 2016, 4 pgs.
McCraven, Jeremy; Notice of Allowance for U.S. Appl. No. 14/273,823, filed May 9, 2014, mailed Jul. 7, 2016, 10 pgs.
Splitz, David Edwin; Non-Final Office Action for U.S. Appl. No. 14/490,081, filed Sep. 18, 2014; mailed Sep. 29, 2016; 34 pgs.

* cited by examiner

| | NEIGHBOR LIST 402 | | | | | |
|---|---|---|---|---|---|---|
| | REMOTE ID | RSSI | HOP COUNT | UPLOAD HOUR | LOAD FACTOR | ORPHAN 406 |
| 404A | 13000268 | 37 | -- | -- | -- | Y |
| 404B | 13000112 | 34 | 1 | 6 | 17 | N |
| 404C | 13001092 | 31 | 1 | 6 | 29 | N |
| 404D | 13001201 | 34 | 2 | 4 | 20 | N |
| | ... | ... | ... | ... | ... | ... |

*FIG. 4*

DYNAMIC ROUTING IN A MESH NETWORK

BACKGROUND

Traditionally, utility meters, such as gas meters, water meters, electricity meters, and the like, were read manually by employees of the associated utility providers. Manual meter reading represented a significant cost to the typical utility provider. With the advent of wireless technology, including mesh networking, utility providers have implemented methods and systems for remote reading and control of these utility meters. Advanced Metering Infrastructure ("AMI"), also known as Advanced Metering Management ("AMM"), are systems that measure, collect and analyze utility data using advanced metering devices such as electronic water meters, gas meters and electricity meters. The metering devices combine automated data measurements with network communications capability enabling the metering devices to transmit and receive data through the AMI network.

In a typical configuration, a metering device, such as a water meter, measures and collects usage data, such as water usage data, at a customer's location. The metering device then uses a built-in communication interface to transmit the usage data through the AMI network to the utility provider's systems, referred to herein as the "host." The metering device may transmit the usage data to the host on a scheduled basis or in response to a request received from the host. In some instances, the AMI network may include a wireless network configured with a mesh networking topology, with the metering devices being amongst the many nodes of the mesh network. Other nodes may include control devices, data collection hubs, repeaters, gateways, and the like. All nodes of the mesh network may cooperate in the distribution of data through the AMI network. A metering device may transmit usage data to the host through one of a number of available paths, or "routes," through the nodes of the mesh network. Each node may be assigned one or more parent nodes with which the node may communicate directly, with the parent nodes responsible for relaying the data through other nodes of the network to the intended destination.

Routing is one of the most costly and time consuming steps in installation of a mesh network. Because the usage data must be transmitted from the metering devices to the host on a timely basis, it is important that the assigned routes be reliable. When a new node is installed in the AMI network, it is usually provided a parent node by the installer. The best parent node may be guessed based on the location of the node and proximity to other nodes in the mesh network. However such guesses based on geographic proximity can be unreliable due to the unpredictable nature of radio links.

It is with respect to these and other considerations that the disclosure made herein is presented.

BRIEF SUMMARY

The present disclosure relates to technologies for dynamically determining and assigning parent nodes and routes for nodes in a mesh network. According to some embodiments, a method of dynamically assigning a parent to an orphaned node of a mesh network comprises the node entering an orphan mode. While in the orphan mode, the node broadcasts an orphan notice over the mesh network to all neighboring nodes, i.e. remote nodes in communication range of the node. The neighboring nodes, upon receiving the orphan notice, add information regarding the orphaned node from the orphan notice to a neighbor list. The information may include communication parameters between the orphaned node and the neighboring node and/or an indication that the node is operating in orphan mode. The neighbor lists of the neighboring nodes are uploaded to a host that determines a new assignment of one or more parent nodes for the node determined based on the information regarding the orphaned node in the uploaded neighbor list. The host sends the parent node assignment back to the orphaned node that updates its configuration accordingly.

According to further embodiments, a computer-readable storage medium comprises processor-executable instructions that, when executed by a processor, cause the processor to send a command message from a host computer to one or more nodes of a mesh network. The command message is configured to cause the nodes to collect communication parameters regarding neighboring nodes in the mesh network and to upload a neighbor list containing the communication parameters regarding the neighboring nodes to the host computer. The host then calculates a link score for the pairs of neighboring nodes in the mesh network based on the communication parameters in the uploaded neighbor lists and assigns one or more parent nodes to at least one of the nodes based on the calculated link scores. The host then sends a command message to the node causing the node to reconfigure based on the command message and begin communicating through the newly assigned one or more parent nodes.

According to further embodiments, a system comprises a device, such as a metering device, configured in an advanced metering infrastructure ("AMI") network and an RF communication component operably connected to the device. The RF communication component comprises a processor and a memory containing a firmware, the firmware being configured to cause the processor to receive a discovery mode command message from a host in the AMI network. Upon receiving the discovery mode command message, the processor listens for communications between neighboring nodes on the AMI network, and, upon detecting a communication between neighboring nodes, adds information regarding a source node of the communications to a neighbor list. The processor then uploads the neighbor list to the host. The processor then receives an assignment of one or more parent nodes in the AMI network from the host, wherein the assignment of the one or more parent nodes defines a route through the AMI network for uploading data from the device to the host, and wherein the assignment of the one or more parent nodes is determined based on the information regarding the source node of the communication in the uploaded neighbor list.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

FIG. 4 is a data structure diagrams showing one example of a neighbor list maintained by the RF communication component of a device in an AMI network, according to embodiments described herein.

DETAILED DESCRIPTION

The following detailed description is directed to technologies for dynamically determining and assigning parent nodes and routes for nodes in a mesh network. Using the technologies described herein, a newly installed node in a mesh network may dynamically establish a parent based on network information regarding nodes and transmission statistics of nodes within communication range of the newly installed node. In addition, existing nodes may be provided with the capability of collecting information regarding the performance of communication links with other nodes within range, and forwarding that information to a server connected to the AMI network in order for the server to determine optimal parent assignment for the nodes in the network. This allows for the routing in the mesh network to be periodically and dynamically reconfigured, ensuring continued optimization and reliability of network.

Instead of relying on geographic proximity, the dynamic routing methods described herein rely on measurement of received signal strength indicator ("RSSI") of transmissions from neighboring nodes providing a more reliable method of assessing the viability of a node-to-node link. Using the dynamic routing methods described herein, utility provider personnel spend less time routing units manually, thus reducing time and installation costs for new node(s). In addition, the dynamic routing methods may provide viable routes on the first routing attempt as well as providing secondary/alternate routes in the same routing pass, thus improving the reliability of the mesh network.

Figure 1:
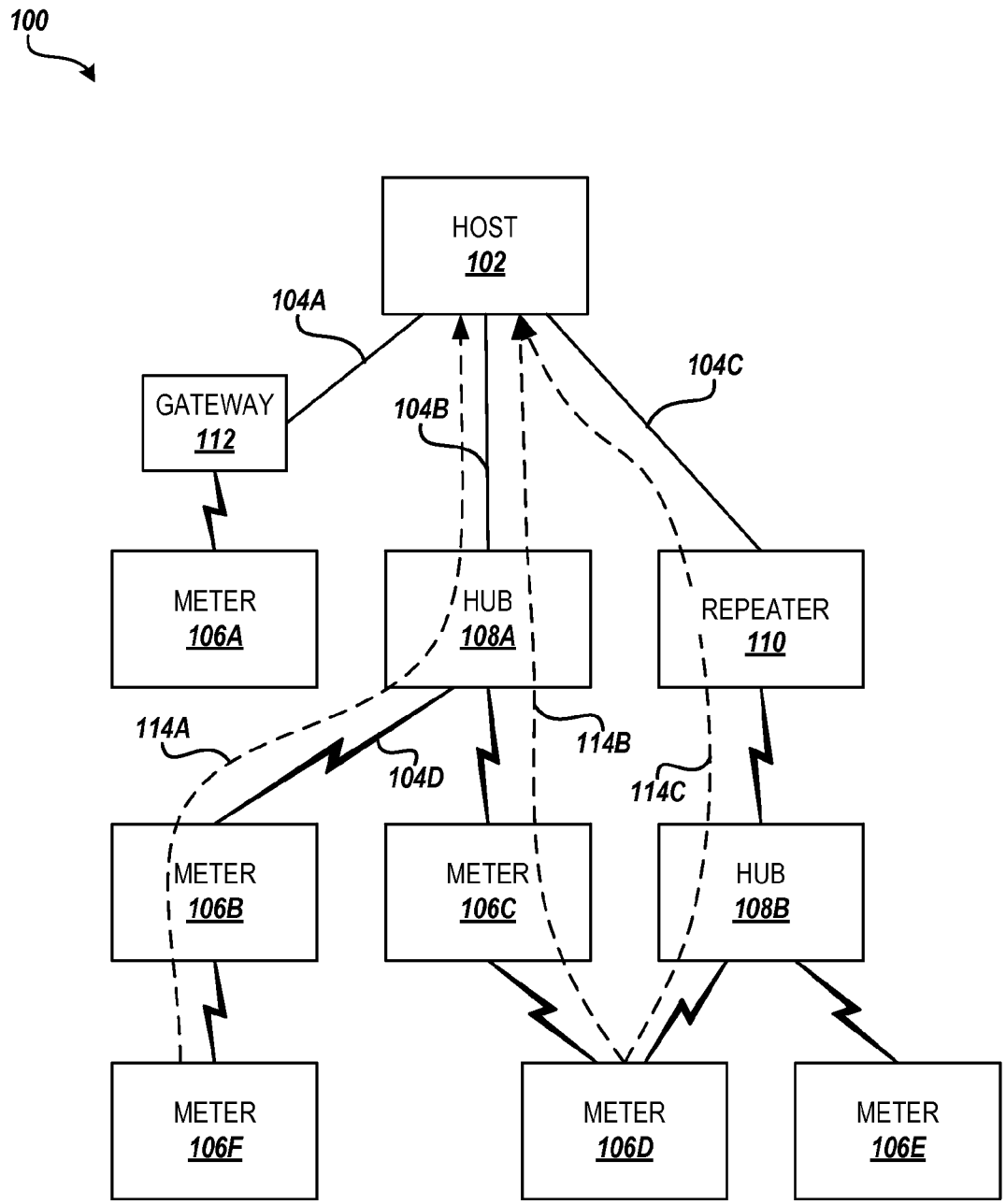
FIG. 1 is a block diagram showing one example of a network topology of an AMI network, according to embodiments described herein.

FIG. 1 is a block diagram showing one example of a network topology of an AMI network 100, such as that implemented by a utility provider. The AMI network 100 may include utility provider systems, such as the host 102. The host 102 may represent a combination of application servers, database servers, communication servers, web servers, and the like that comprise the systems of the utility provider used to collect data from, control and manage the meters and other devices of the AMI network 100. The host 102 may be connected to a variety of devices in the AMI network 100 through various communication links 104A-104D (referred to herein generally as communication links 104). The communication links 104 may include radio frequency ("RF") communication links, cellular data links, Wi-fi or WiMAX networks links, satellite communication links, metropolitan-area networks ("MANs"), wide-area networks ("WANs"), the Internet, and the like. The devices of the AMI network 100 may include advanced metering devices 106A-106F (referred to herein generally as meters 106), such as electronic water meters, gas meters, electricity meters, and the like, that manage and collect data regarding a customer's used of the utility at the customers location. The devices of the AMI network 100 may further include communication devices, such as data collection hubs (108A-108B (referred to herein generally as hubs 108), repeaters 110, gateways 112, and the like. The AMI network 100 may also include other infrastructure communication, monitoring and control devices (not shown), such as valves, sensors, control panels, and the like.

According to embodiments, the AMI network 100 may include a number of the devices 106, 108, 110, 112 configured in a mesh networking topology. The devices configured in the mesh network may comprise a collection of advance metering devices 106, data collection hubs 108, repeaters 110, gateways 112, and other devices or "nodes" communicating with each other using RF communication links, such as communication link 104D. The mesh network may comprise a routed network, with the nodes 106, 108, 110, 112 having predefined "parent" and "child" relationships based on a routing hierarchy determined for the network. Each node 106, 108, 110, 112 may be assigned one or more parent nodes with which the node may communicate directly, with the parent nodes responsible for relaying the data through other nodes of the mesh network to the intended destination. For example, a metering device 106F may send usage data to the host 102 by transmitting the data to its assigned parent node, meter 106B, which relays the data to its parent, hub 108A, which is in communication with the host over communication link 104B. As such, the route 114A (referred to herein generally as routes 114) for meter 106F to communicate with the host 102 may be determined by the parent and child relationships defined between the meter 106F, the meter 106B, and the hub 108A.

It will be appreciated that because a node may be assigned more than one parent node, multiple routes may exist between the node and the host 102. For example, meters 106D may be assigned two parent nodes comprising of meter 106C and hub 108B, resulting in two, independent routes 114B and 114C between meter 106D and the host 102. Other configurations of parent and child relationships may be imagined, including a single parent paired with a single child, and it is intended that all such configurations be included in this disclosure.

In some embodiments, the nodes 106, 108, 110, 112 of the wireless mesh network may employ frequency-hopping spread spectrum ("FHSS") technology to transmit and receive data between them. For example, the nodes may be configured to comply with F.C.C. rules and regulations part 15 (47 C.F.R. §15). FHSS is a method of transmitting and receiving radio signals by rapidly switching among many frequency channels using a pseudorandom channel sequence known to both the transmitting and receiving devices. In order to increase battery life while increasing data transmission reliability and reducing system response times, each of the nodes 106, 108, 110 of the mesh network may operate in one of 3 states: a SLEEP state used to conserve battery life; a SLAVE state used for responding to and receiving data from a MASTER state device; and a MASTER state used to initiate communications with (i.e., "hail") and send data to a SLAVE state device.

In SLEEP state, a device partially awakens and briefly listens for a "hailing" signal on a hailing channel from another device in MASTER state. If the device in SLEEP state fails to detect a hailing signal, the device remains in SLEEP state and periodically partially awakens to listen for a hailing signal. The SLEEP state device changes hailing channels based on a predefined pseudorandom hailing channel frequency set dependent upon a system time. Once the SLEEP state device is "hailed" by a MASTER state device, it fully awakens and begins listening for data messages from the MASTER state device on a predefined data channel selected from the predefined pseudorandom data channel frequency set, the data channel being indicated by the MASTER state device. In other words, the SLEEP state device exits SLEEP state and enters SLAVE state.

In SLAVE state, a device listens for and receives data messages on a data channel selected from the predefined pseudorandom data channel frequency set. The MASTER state device indicates which data channel to use by sending a data channel pointer to the target device during the hailing process. After receiving each message from the MASTER state device, the SLAVE state device sends an acknowledgement ("ACK") message to the MASTER state device, indicating a successfully received data message. The SLAVE state device and the MASTER state device then switch to the next data channel in the data channel frequency set and continue communications until all data messages have been sent.

In MASTER state, a device "hails" a SLEEP state device by sending a hailing signal on a hailing channel to the targeted SLEEP state device. The MASTER state device selects which hailing channel to use based on: 1) the SLEEP state device's predefined pseudorandom hailing channel frequency set, 2) a system time corresponding to the hailing channel frequency set, and 3) an address or "node ID" of the SLAVE state device. The node ID is an identifier, such as an alphabetic and/or numeric string, associated with and unique to a device. The system time on the MASTER state device and the system time on the SLAVE state device are substantially in synchronization. Upon successfully "hailing" the sleeping device (which upon hailing becomes a SLAVE state device), the MASTER state device begins sending data messages on a data channel to the SLAVE state device. The data channel is selected from the SLAVE state device's predefined pseudorandom data channel set based on the system time. In some embodiments, the data channel frequency set is common to the MASTER state device and the SLAVE state device. In such a configuration, the MASTER state device may indicate to the SLAVE state device during the hailing procedure what the next available data channel is by sending to the SLAVE state device a data channel pointer.

In some embodiments, hailing channels and data channels are selected from the 902-928 MHz industrial, scientific, and medical ("ISM") bandwidth. In some embodiments, one hundred (100) channels are chosen with a minimum channel spacing of 100 kHz each. Fifty (50) of the channels are randomly assigned to the pseudorandom data channel frequency set, and fifty (50) different channels are randomly assigned to the hailing channel frequency set. The set of fifty (50) hailing channels are used during the MASTER and SLEEP states to send and receive hailing requests while the set of fifty (50) data channels are used during the MASTER and SLAVE states to send and receive data messages.

A non-limiting, exemplary set of 50 hailing channels (from hailing channel 0 to hailing channel 49) is shown below in Table 1. In some embodiments, these hailing channels may be grouped into hailing channel groups. For example, hailing channel group 0 may include hailing channels 0 and 1 (908.15 MHz and 919.8 MHz), while hailing channel group 1 may include hailing channels 2 and 3 (922.65 MHz and 902.65 MHz), continuing through hailing channel group 24. More generally, hailing channel group "n" may include hailing channel "x" and hailing channel "x+1" where "x" represents a hailing channel. In other embodiments, hailing channel groups may include a different number or combination of hailing channels.

TABLE 1

Hailing Channel Frequency Set

| Ch. | Freq. | Ch. | Freq. | Ch. | Freq. | Ch. | Freq. |
| --- | --- | --- | --- | --- | --- | --- | --- |
| 0 | 926.8 MHz | 1 | 922.96 MHz | 2 | 925.48 MHz | 3 | 922.72 MHz |
| 4 | 922 MHz | 5 | 925.96 MHz | 6 | 922.84 MHz | 7 | 922.48 MHz |
| 8 | 923.32 MHz | 9 | 925 MHz | 300 | 923.2 MHz | 11 | 924.52 MHz |
| 12 | 925.12 MHz | 13 | 922.6 MHz | 14 | 923.68 MHz | 15 | 925.36 MHz |
| 16 | 924.16 MHz | 17 | 927.76 MHz | 18 | 927.88 MHz | 19 | 927.4 MHz |
| 20 | 924.76 MHz | 21 | 924.28 MHz | 22 | 926.92 MHz | 23 | 926.44 MHz |
| 24 | 927.16 MHz | 25 | 922.63 MHz | 26 | 924.04 MHz | 27 | 923.92 MHz |
| 28 | 923.56 MHz | 29 | 923.08 MHz | 30 | 922.24 MHz | 31 | 927.28 MHz |
| 32 | 926.2 MHz | 33 | 926.08 MHz | 34 | 923.8 MHz | 35 | 924.88 MHz |
| 36 | 925.24 MHz | 37 | 925.84 MHz | 38 | 923.44 MHz | 39 | 927.52 MHz |
| 40 | 922.12 MHz | 41 | 926.56 MHz | 42 | 924.64 MHz | 43 | 927.64 MHz |
| 44 | 924.4 MHz | 45 | 927.04 MHz | 46 | 926.68 MHz | 47 | 925.72 MHz |
| 48 | 926.32 MHz | 49 | 925.6 MHz | | | | |

A non-limiting, exemplary set of 50 data channels (beginning with data channel 0 and continuing through data channel 49) is shown below in Table 2. In some embodiments, these data channels may be grouped into data channel groups. For example, data channel group 0 may include data channels 0 and 1 (922 MHz and 904.5 MHz), while data channel group 1 may include data channels 2 and 3 (908 MHz and 925 MHz), continuing through data channel group 24. More generally, data channel group "p" may include data channel "y" and data channel "y+1" where "y" represents a data channel. In other embodiments, data channel groups may include a different number or combination of data channels. In some embodiments, the data channels are not grouped.

TABLE 2

Data Channel Frequency Sets

| Ch. | Freq. | Ch. | Freq. | Ch. | Freq. | Ch. | Freq. |
|---|---|---|---|---|---|---|---|
| 0 | 922.94 MHz | 1 | 922.1 MHz | 2 | 923.78 MHz | 3 | 922.46 MHz |
| 4 | 926.9 MHz | 5 | 927.26 MHz | 6 | 922.82 MHz | 7 | 923.3 MHz |
| 8 | 927.86 MHz | 9 | 927.5 MHz | 300 | 923.9 MHz | 11 | 926.42 MHz |
| 12 | 925.46 MHz | 13 | 927.38 MHz | 14 | 926.3 MHz | 15 | 925.7 MHz |
| 16 | 925.1 MHz | 17 | 926.18 MHz | 18 | 925.94 MHz | 19 | 924.02 MHz |
| 20 | 927.98 MHz | 21 | 926.66 MHz | 22 | 924.98 MHz | 23 | 927.62 MHz |
| 24 | 924.74 MHz | 25 | 925.22 MHz | 26 | 925.34 MHz | 27 | 924.62 MHz |
| 28 | 924.5 MHz | 29 | 926.54 MHz | 30 | 924.14 MHz | 31 | 923.66 MHz |
| 32 | 925.58 MHz | 33 | 922.22 MHz | 34 | 924.26 MHz | 35 | 927.02 MHz |
| 36 | 922.34 MHz | 37 | 926.06 MHz | 38 | 926.78 MHz | 39 | 923.42 MHz |
| 40 | 927.74 MHz | 41 | 924.86 MHz | 42 | 924.38 MHz | 43 | 922.7 MHz |
| 44 | 922.58 MHz | 45 | 925.82 MHz | 46 | 923.54 MHz | 47 | 927.14 MHz |
| 48 | 923.18 MHz | 49 | 923.06 MHz | | | | |

In some embodiments, a particular device selects an initial subset of two (2) consecutive channels (i.e., a channel group) from its predefined pseudorandom hailing channel frequency set to be used while in the SLEEP state by first calculating a channel offset based on its node ID. This offset is added to a hailing channel pointer. The hailing channel pointer points to one of the fifty (50) available hailing channels, and increments to the next set of two (2) channels every, for example, 18 seconds so that each device will continuously "hop" through all of the fifty (50) available hailing channels at a system hopping rate. In this manner, hailing channel usage is spread across the predefined hailing channel. In some embodiments, the hailing channel usage may be substantially equal manner such that each channel within the hailing channel frequency set is used for substantially the same amount of time or for substantially the same number of times. In further embodiments, the hailing channel usage might be skewed to use hailing channels with less interference more frequently while using hailing channels with more interference less frequently. When sending and receiving data messages in MASTER and SLAVE states, the devices hop through the data channel frequency set to assure that, on average, all data channels are used equally.

It will be understood that, as used herein, "parent" and "child" nodes in the mesh network should not be confused with "MASTER state" and "SLAVE state" devices. MASTER state and SLAVE state are merely states/modes for each device. It will be further appreciated that the configuration of the mesh network comprising the AMI network 100 shown in FIG. 1 and described above is merely one configuration, and additional devices and/or alternative configurations may be conceived by one skilled in the art. As such, the network topology shown in FIG. 1 and the mesh network configurations described should not be seen as limiting but, instead, as merely exemplary.

Figure 2:
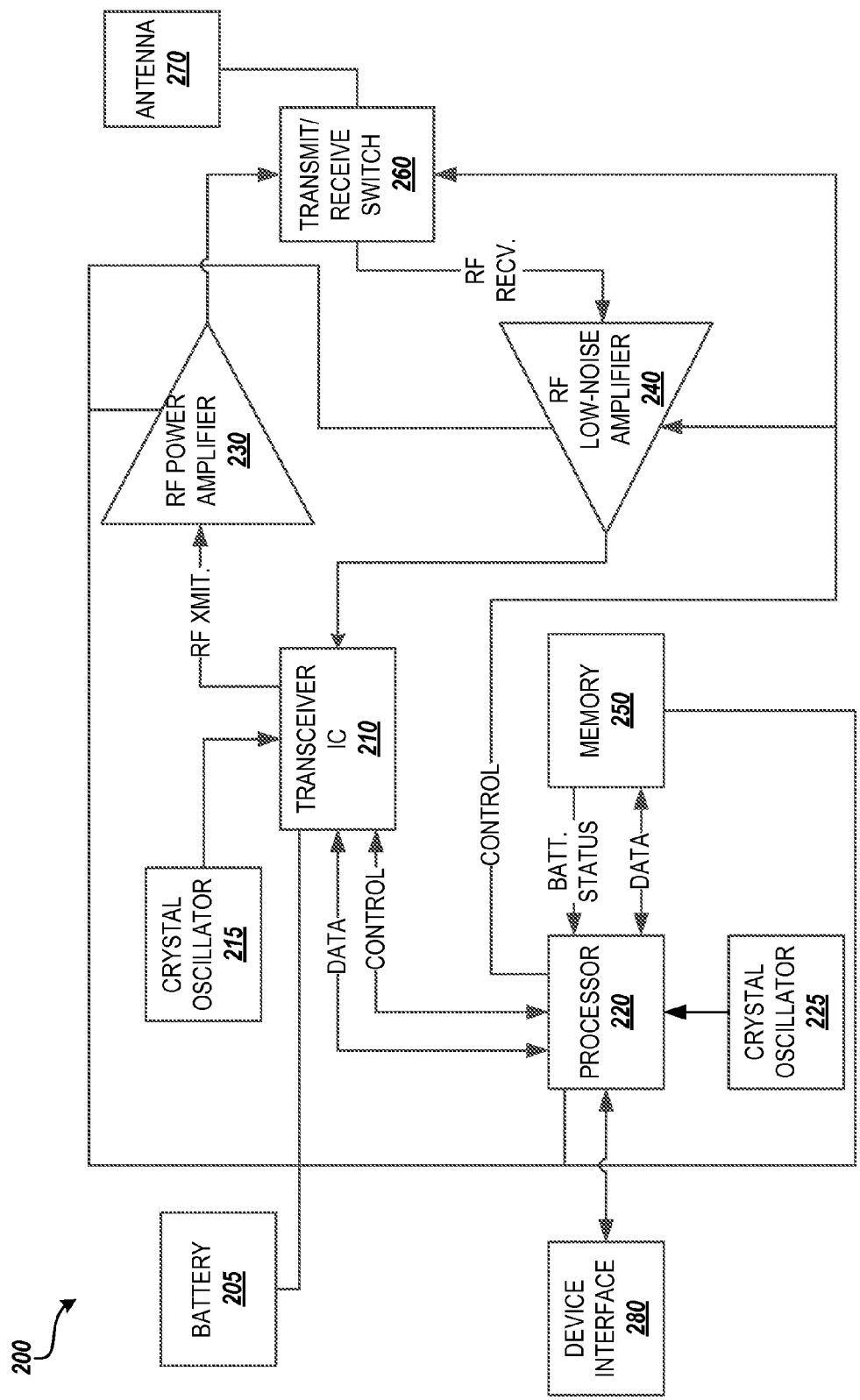
FIG. 2 is a block diagram of an RF communication component of a device in the AMI network, according to embodiments described herein.

FIG. 2 shows a block diagram of an RF communication component 200 of a device 106, 108, 110 in the AMI network 100. The RF communication component 200 may allow the devices or nodes to communicate with one another over the wireless AMI network. For example the RF communication component 200 may be implemented in or connected to an advanced metering device 106 in order to communicate usage data to the host 102, as described above in regard to FIG. 1. According to embodiments, the RF communication component 200 may be configured for communication on various radio topologies, including mesh networking, point-to-point, point-to-multipoint, star, and the like. In other embodiments, the RF communication component 200 may be configured to communicate in multiple topologies.

The RF communication component 200 may include a battery 205 that powers a transceiver integrated circuit ("IC") 210, a processor 220, an RF power amplifier 230, an RF low-noise amplifier 240, and a memory 250. Crystal oscillators 215 and 225 are connected to the transceiver IC 210 and the processor 220, respectively. The RF communication component 200 further includes a transmit/receive switch 260 and antenna 270. The processor 220 may be a microprocessor, a microcontroller, a field-programmable gate array ("FPGA"), or the like. The processor 220 and the transceiver IC 210 may include both a two-way data and a two-way control line. In some embodiments, the Processor 220 includes a control line to each of the RF low-noise amplifier 240 and the transmit/receive switch 260. The processor 220 may also be connected to the memory 250 by both a two-way data line and by a battery status line, the battery line included so that flash memory may notify the processor 220 of its power and battery status.

The memory 250 may comprise a computer-readable storage medium for storing processor-executable instructions, data structures and other information. The memory 250 may include a non-volatile memory, such as read-only memory ("ROM") and/or FLASH memory, and a random-access memory ("RAM"), such as dynamic random access memory ("DRAM") or synchronous dynamic random access memory ("SDRAM"). The memory 250 may store a firmware that comprises commands and data necessary for the device 106, 108, 110 to communicate with other devices in the AMI network 100 as well as perform other operations of the RF communication component 200. According to some embodiments, the memory 250 may store processor-executable instructions that, when executed by the processor 220, perform portions of the routines 600 and 700 for dynamically determining and assigning parent nodes and routes for nodes in a mesh network, as described herein.

In addition to the memory 250, the RF communication component 200 may have access to other computer-readable media storing program modules, data structures, and other data described herein for dynamically determining and assigning parent nodes and routes for nodes in a mesh network. It will be appreciated by those skilled in the art that computer-readable media can be any available media that may be accessed by the processor 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

According to embodiments, the processor 220 may be further connected to other components of the device 106, 108, 110 through a device interface 280. In some embodiments, the device interface 280 may connect to an electronic utility meter component, such as a water meter or an electricity meter, that allows the meter to provide usage data for transmission through the wireless mesh network. In further embodiments, the device interface 280 may connect to a reporting and testing component, such as a water or gas leak detector, that allow status information and alarms regarding the utility provider's infrastructure to be transmitted through the AMI network 100 by the RF communication component 200. In still further embodiments, the device interface 280 may connect to a control component, such as an electronically actuated water valve, that allows the host 102 or other devices 106, 108, 110 on the AMI network 100 to control aspects of the utility provider's infrastructure. These examples are not meant to be limiting, and those of skill in the art will recognize that alternative device components that may be interfaced with the RF communication component 200 through the device interface 280.

It will be appreciated that the structure and/or functionality of the RF communication component 200 may be different that that illustrated in FIG. 2 and described herein. For example, the transceiver IC 210, processor 220, RF power amplifier 230, RF low-noise amplifier 240, memory 250, crystal oscillators 215, 225, device interface 280 and other components and circuitry of the RF communication component 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the RF communication component 200 may not include all of the components shown in FIG. 2, may include other components that are not explicitly shown in FIG. 2 or may utilize an architecture completely different than that shown in FIG. 2.

Figure 3:
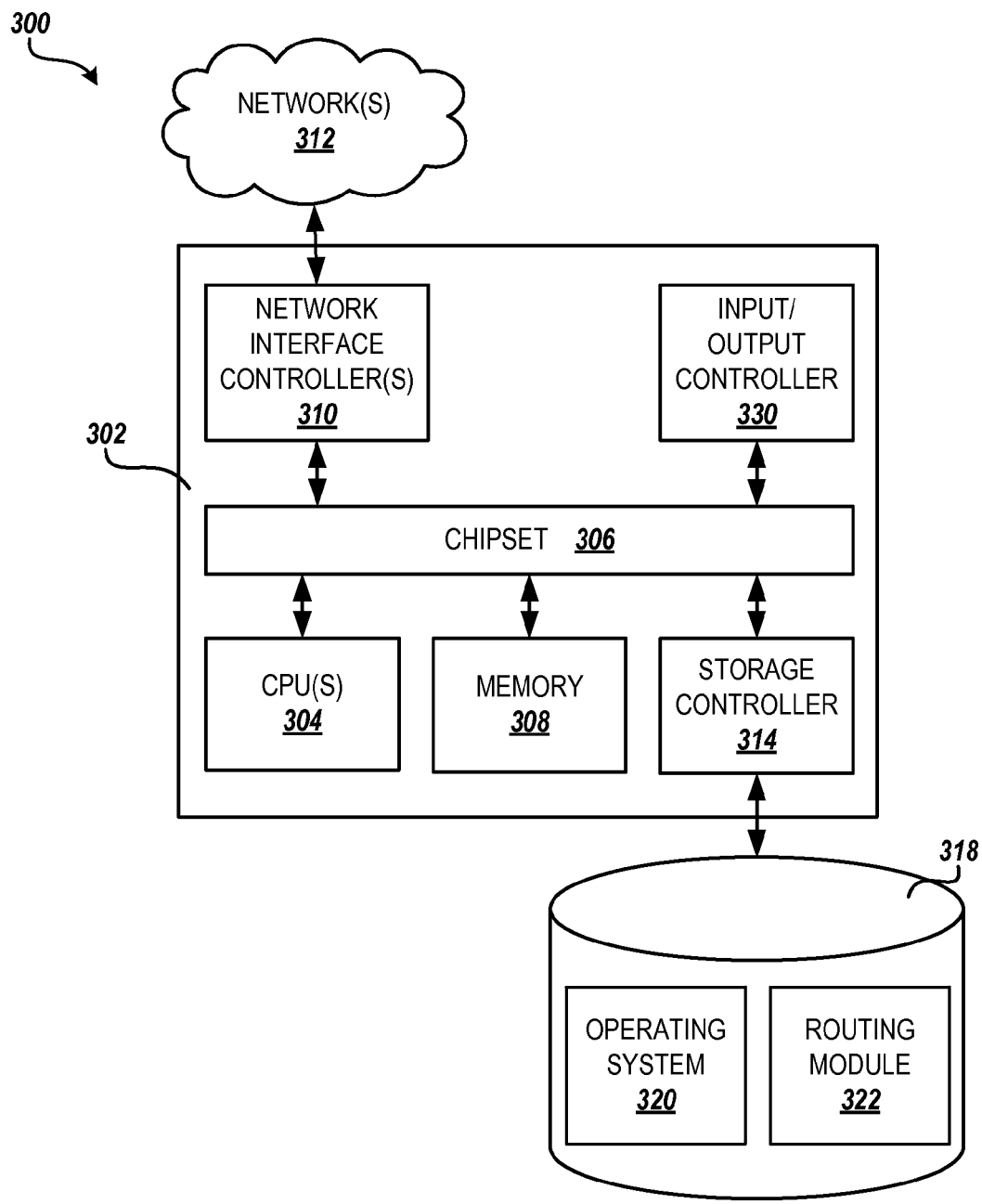
FIG. 3 is a block diagram showing an example computer architecture for a computer capable of executing the software components described herein for dynamically determining and assigning parent nodes and routes for nodes in a mesh network, according to embodiments described herein.

FIG. 3 shows an example computer architecture 300 for a computer 302 capable of executing the software components described herein for dynamically determining and assigning parent nodes and routes for nodes in a mesh network. The computer architecture 300 shown in FIG. 3 illustrates a conventional server computer, workstation, desktop computer, laptop, or other computing device, and may be utilized to execute any aspects of the software components presented herein described as executing on the host 102, or other computing platform. The computer 302 includes a baseboard, or "motherboard," which is a printed circuit board to which a multitude of components or devices may be connected by way of a system bus or other electrical communication paths. In one illustrative embodiment, one or more central processing units ("CPUs") 304 operate in conjunction with a chipset 306. The CPUs 304 are standard programmable processors that perform arithmetic and logical operations necessary for the operation of the computer 302.

The CPUs 304 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 306 provides an interface between the CPUs 304 and the remainder of the components and devices on the baseboard. The chipset 306 may provide an interface to a memory 308. The memory 308 may include a random access memory ("RAM") used as the main memory in the computer 302. The memory 308 may further include a computer-readable storage medium such as a read-only memory ("ROM") or non-volatile RAM ("NVRAM") for storing basic routines that that help to startup the computer 302 and to transfer information between the various components and devices. The ROM or NVRAM may also store other software components necessary for the operation of the computer 302 in accordance with the embodiments described herein.

According to various embodiments, the computer 302 may operate in a networked environment using logical connections to remote computing devices through one or more networks 312, such as the wireless mesh network described herein, a local-area network ("LAN"), a wide-area network ("WAN"), the Internet, or any other networking topology known in the art that connects the computer 302 to the devices and other remote computers. The chipset 306 includes functionality for providing network connectivity through one or more network interface controllers ("NICs") 310, such as a gigabit Ethernet adapter. For example, the NIC 310 may be capable of connecting the computer 302 to the devices 106, 108, 110 in the AMI network 100 as well as other computer devices in the utility provider's systems. It should be appreciated that any number of NICs 310 may be present in the computer 302, connecting the computer to other types of networks and remote computer systems beyond those described herein.

The computer 302 may be connected to a mass storage device 318 that provides non-volatile storage for the computer. The mass storage device 318 may store system programs, application programs, other program modules, and data, which are described in greater detail herein. The mass storage device 318 may be connected to the computer 302 through a storage controller 314 connected to the chipset 306. The mass storage device 318 may consist of one or more physical storage units. The storage controller 314 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 302 may store data on the mass storage device 318 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 318 is characterized as primary or secondary storage, or the like. For example, the computer 302 may store information to the mass storage device 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 302 may further read information from the mass storage device 318 by detecting the physical states or characteristics of one or more particular locations within the physical storage units.

The mass storage device 318 may store an operating system 320 utilized to control the operation of the computer 302. According to some embodiments, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 318 may store other system or application programs and data utilized by the computer 302, such as a routing modules 322 utilized by the computer to dynamically determining and assigning parent nodes and routes for nodes in a mesh network, as described herein.

In some embodiments, the mass storage device 318 may be encoded with computer-executable instructions that, when loaded into the computer 302, may transform the computer from a general-purpose computing system into a special-purpose computer capable of implementing the embodiments described herein. These computer-executable instructions transform the computer 302 by specifying how the CPUs 304 transition between states, as described above. According to some embodiments, the mass storage device 318 may store computer-executable instructions that, when executed by the computer 302, perform portions of the routines 600 and 700 for dynamically determining and assigning parent nodes and routes for nodes in a mesh network, as described herein. In further embodiments, the computer 302 may have access to other computer-readable storage medium in addition to or as an alternative to the mass storage device 318.

The computer 302 may also include an input/output controller 330 for receiving and processing input from a number of input devices, such as a keyboard, a mouse, a touchpad, a touch screen, an electronic stylus, or other type of input device. Similarly, the input/output controller 330 may provide output to a display device, such as a computer monitor, a flat-panel display, a digital projector, a printer, a plotter, or other type of output device. It will be appreciated that the computer 302 may not include all of the components shown in FIG. 3, may include other components that are not explicitly shown in FIG. 3, or may utilize an architecture completely different than that shown in FIG. 3.

Figure 5:
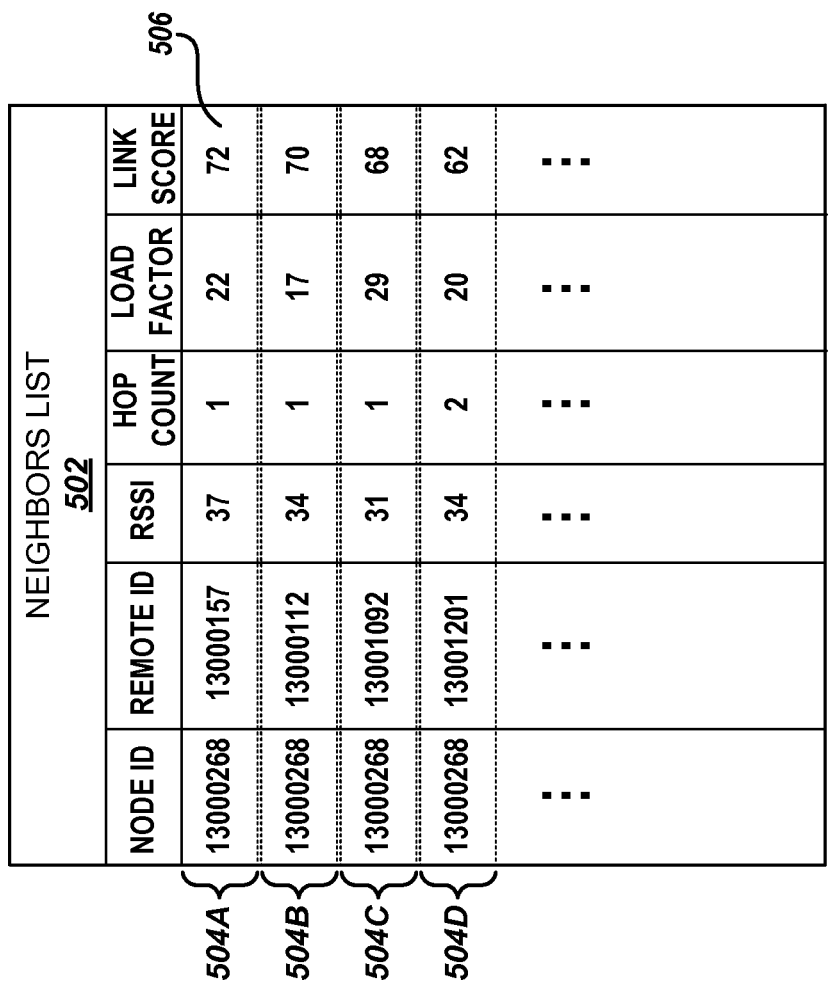
FIG. 5 is a data structure diagrams showing another example of a neighbors list maintained by a host for nodes or devices in an AMI network, according to embodiments described herein.

FIGS. 4 and 5 are data structure diagrams showing a number of data elements stored in data structures. It will be appreciated by one skilled in the art that data structures shown in the figure may represent rows in a database table, instances of objects stored in a computer memory, programmatic structures, or any other data container commonly known in the art. Each data element included in the data structure may represent one or more fields or columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

FIG. 4 shows one example of a neighbor list 402 maintained by the RF communication component 200 of a device 106, 108, 110 in an AMI network 100, such as the wireless mesh network described herein. The neighbor list 402 may be maintained during normal communications with other devices on the network 100, and/or rebuilt anew when performing operations and routines for dynamically determining and assigning parent nodes and routes for nodes in a mesh network, as described herein. According to some embodiments, the neighbor list 402 may be maintained in the memory 250 of the RF communication component 200.

The neighbor list 402 may contain a number of remote node entries 404A-404D (referred to herein generally as remote node entry 404), each entry corresponding to a remote device or node within the mesh network with which the RF communication component 200 may communicate, i.e. is within communication range of the node containing the RF communication component. According to some embodiments, each remote node entry 404 may contain the node ID of the remote node. The node ID may represent a unique identifier of the remote node within the network 100, such as a MAC address of the node, for example. Each remote node entry 404 may further include a receive signal strength indicator ("RSSI") measurement associated with the remote node. The RSSI measurement may indicate how much energy is present in a communication channel when the node is receiving communications from the remote node. The RSSI measurement may be obtained from the transceiver IC 210 of the RF communication component 200, for example.

Each remote node entry 404 may also contain a hop count for the remote node, indicating a number of network hops, or intervening nodes within the mesh network, between the remote node and the host 102, a hop count of 1 meaning that the remote node is in direct communication with the host. Each remote node entry 404 may also contain a load factor, indicating a relative number of child or ancestor nodes within the mesh network for which the corresponding remote node acts as a parent node. In some embodiments, each remote node entry 404 may also contain an upload hour, indicating a time slot in which the remote node performs routine uploads of data to the host 102.

According to further embodiments, each remote node entry 404 may contain an orphan flag 406. The orphan flag 406 may indicate that the remote node is operating in an orphan mode, having lost communication with its parent. The orphan flag 406 of the remote node entry 404 may be set by the RF communication component 200 when the information regarding the remote node is received in an orphan notice broadcast, as will be described in more detail below. It will be appreciated that additional data elements may be maintained in the neighbor list 402 for each remote node entry 404 beyond those described herein, and that not every data element or attribute described will be available for every remote node entry 404 in the neighbor list.

FIG. 5 shows another example of a neighbors list 502 maintained by the host 102 for the nodes or devices 106, 108, 110 in the AMI network 100, according to some embodiments. The neighbors list 502 may be compiled from the neighbor list 402 of each individual node or device 106, 108, 110 in the mesh network. The neighbor list 402 of the devices 106, 108, 110 in the mesh network may be periodically uploaded to the host 102 and/or may be requested by the host performing operations and routines for dynamically determining and assigning parent nodes and routes for nodes in a mesh network, as described herein. According to some embodiments, the neighbors list 502 may be maintained by the routing module 322 in the memory 308 of a computer 302 comprising the host 102 or other computer system of the utility provider.

The neighbors list 502 may contain neighboring nodes entries 504A-504D (referred to herein generally as neighboring nodes entry 504), each entry corresponding to a pair of neighboring devices or node within the mesh network, i.e. a pair of nodes that are within communication range of each other. According to some embodiments, each neighboring nodes entry 504 may contain the node ID of the node that reported the communication parameters for the pair of nodes as well as the node ID of the remote node to which the communication parameters pertain. Each neighboring nodes entry 504 may further include the ("RSSI") measurement measured by the reporting node for the remote node, and the hop count associated with the remote node. Each neighboring nodes entry 504 may also contain the load factor for the remote node.

According to further embodiments, each neighboring nodes entry 504 may also contain a link score 506. The link score 506 may indicate a relative viability of the communication link 104 between the neighboring nodes or devices 106, 108, 110 within the network and may be calculated by the routing module 322 from one or more of the communication parameters in the neighboring nodes entry 504 pertaining to the neighboring nodes. The link score 506 may be further utilized by the routing module 322 for dynamically determining and assigning parent nodes and routes for nodes in a mesh network, as described below. In some embodiments, the link score 506 may be calculated from the RSSI measurement between the nodes. In further embodiments, the link score 506 may be calculated from an algorithm that combines the weighted value of the factors shown below in Table 3. The factors may be calculated from the communication parameters for the neighboring nodes from the corresponding neighboring nodes entry 504, as shown.

TABLE 3

Factors for Link Score

| Factor | Definition | Formula | Weight |
|---|---|---|---|
| Link Strength | How good is the actual link | (RSSI − 15)/48 | 50 |
| Hop Factor | How many hops | 1/(Hop Count)$^2$ | 40 |
| Parent Burden (Load Factor) | How much is it used | (100 − # ancestors)/100 for battery powered device; (500 − # ancestors)/500 for repeater; 1 for electrically connected device; | 10 |

It will be appreciated that additional data elements may be maintained in the neighbors list 502 for each neighboring nodes entry 504 beyond those described herein, and that not every data element or attribute described will be available for every neighboring nodes entry 504 in the neighbors list.

Figure 6:
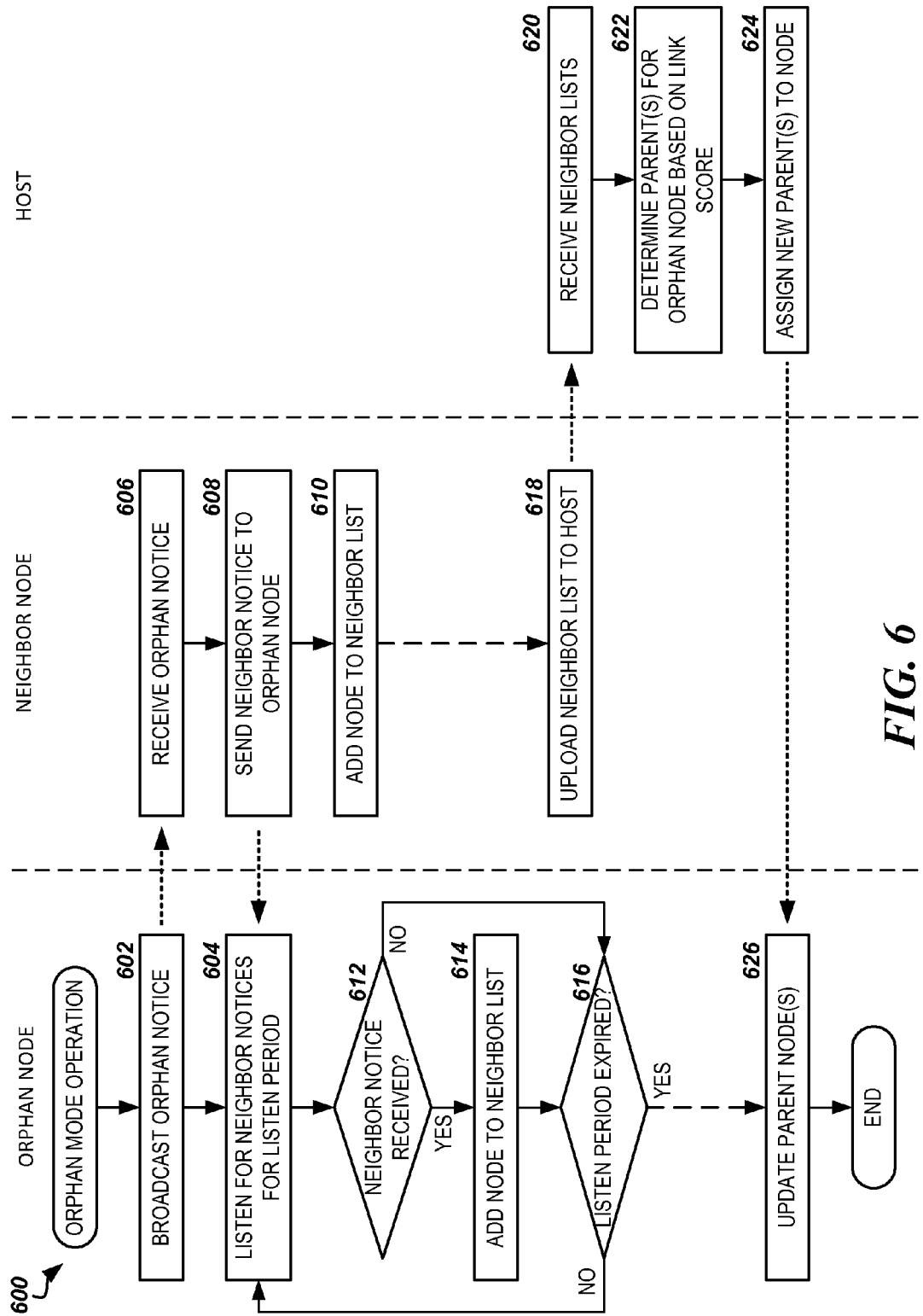
FIG. 6 is a flow diagram showing one routine for selecting a parent for an orphaned node or device in wireless mesh network, according to embodiments described herein.

FIG. 6 is a flow diagram showing one method for dynamically determining and assigning parent nodes and routes for nodes in a mesh network, according to some embodiments. Specifically, FIG. 6 illustrates one routine 600 for selecting a parent for an orphaned node or device 106, 108, 110 in wireless mesh network comprising the AMI network 100. According to embodiments, an orphan mode may be utilized by a node in the wireless mesh network when newly installed or when communications with a parent node have been lost. The orphan mode allows the node to discover potential links with other, neighboring nodes (i.e., nodes in communication range) based on RSSI measurements or other communication parameters regarding communications with the neighboring nodes.

According to some embodiments, the routine 600 may be performed by a combination of the RF communication component 200 of the orphaned node, the communication component of neighboring node(s), and the routing module 322 of the host 102, as shown in the figure. In other embodiments, the routine 600 may be performed by the RF communication component 200 of the orphaned node (device 106, 108, 110), by the host 102, by other processors or computing systems performing routing for the AMI network 100, or by some other combination of modules, processors and devices.

The RF communication component 200 of the orphaned node may enter the orphan mode when it is detected that communications with its assigned parent are lost, e.g. when successfully communications with its assigned parent have not been performed for some period of time or after some number of failures of handshake (hails) between node and parent have occurred. For example, the RF communication component 200 may enter orphan mode when it has been without a parent for 10 days. The RF communication component 200 of the orphaned node may also enter the orphan mode upon receiving a command from the host 102. For example, an administrator of the utility provider's infrastructure may cause the host 102 to send an orphan mode command message to one or more meters 106, hubs 108 and/or repeaters 110 in the AMI network 100 in order to initially perform routing in newly installed devices or optimize routing in an existing portion of the network. The RF communication component 200 of the orphaned node may also enter the orphan mode upon receiving input locally by an installer, repair technician, or other authorized personnel of the utility provider.

The routine 600 begins at step 602, where the RF communication component 200 of the orphaned node broadcasts an orphan notice over the wireless network. For example, using the FHSS communications described above in regard to FIG. 1, the RF communication component 200 may broadcast an orphan notice over all 50 of the available hailing channels. In some embodiments, the orphan notice may include the message elements or fields described below in Table 4.

TABLE 4

Orphan Notice Message

| Field | Offset | Bytes | Description |
|---|---|---|---|
| 0xC4 | 0 | 1 | Start of Packet Mark |
| 0x10 | 1 | 1 | Packet type: Orphan Notice |
| 0xffffffff | 2 | 4 | Broadcast address |

TABLE 4-continued

Orphan Notice Message

| Field | Offset | Bytes | Description |
|---|---|---|---|
| <SRC> | 6 | 4 | Node ID or address |
| <PPRNT> | 10 | 4 | Primary parent (0 = none configured) |
| <CRC16> | 14 | 2 | CRC-16 for packet |

Next, the routine proceeds from step 602 to step 604, where the RF communication component 200 of the orphaned mode begins to listen for neighbor notices from neighboring nodes or devices 106, 108, 110 in the mesh network for some listening period of time. According to some embodiments, all devices 106, 108, 110 on the wireless mesh network are configured to respond to orphan notices when received from any node within communication range. As shown at step 606, when an orphan notice is received at a neighboring node, the routine proceeds to step 608, where the RF communication component 200 of the neighboring node may respond to the broadcast orphan notice with a neighbor notice including the message elements or fields described below in Table 5.

TABLE 5

Neighbor Notice Message

| Field | Offset | Bytes | Description |
|---|---|---|---|
| 0xC4 | 0 | 1 | Start of Packet Mark |
| 0x11 | 1 | 1 | Packet type: neighbor notice |
| 0xffffffff | 2 | 4 | Broadcast address |
| <SRC> | 6 | 4 | Node ID or address |
| <HOP> | 10 | 1 | Hop Count, 0xff = unknown |
| <UHOUR> | 11 | 1 | Upload Hour, 0xff = unknown |
| <LOAD> | 12 | 1 | Load Factor, 0xff = unknown |
| <CRC16> | 14 | 2 | CRC-16 for packet |

In some embodiments, the neighboring node may wait a random period of time, such as between one minute and an hour, after receiving the orphan notice before sending the neighbor notice. According to some embodiments, the neighbor notice is sent to the orphaned node on one or more hailing channels depending on the FHSS channel selection algorithm, the current time, and the node ID of the orphaned node, as described above in regard to FIG. 1. In other embodiments, the neighbor notice may be broadcast on all 50 of the available hailing channels.

In addition to responding to the orphan notice with the neighbor notice, the RF communication component 200 of the neighboring node further adds a remote node entry 404 for the orphaned node in its neighbor list 402, as shown at step 610. The remote node entry 404 may include at least the node ID of the orphaned and the RSSI measurement of the received orphan notice. The remote node entry 404 may further include the orphan flag 406 indicating that the remote node is operating in orphan mode. This new remote node entry 404 may be provided to the host 102 with the next upload of the neighbor list 402 from the neighboring node, as is described below in regard to step 618.

According to one embodiment, if a neighboring node receives a broadcast orphan notice from a node that is assigned as its child node in the mesh network, the neighboring node may attempt to sync with the orphaned node in order to re-establish communications with the node. If a hail is received from a purported parent node by a node operating in orphan mode, the RF communication component 200 of the orphaned node may cancel the orphan mode and sync with the parent node, before returning to normal operation.

In some embodiments, the RF communication component 200 of the orphaned node may enter a "super-sniff" state in order to listen for neighbor notices from neighboring nodes in the mesh network. In the super-sniff state, the orphaned mode may periodically wakeup from the SLEEP state and listens on all 50 hailing channels for the neighbor notices. Because the orphaned node may not have synched with its parent for an extended period of time, the system time maintained by the node may not be correct, and therefore relying on the channel selection algorithm may not yield the proper hailing channel(s) to which to listen for the neighbor notices. By using the super-sniff state, the orphaned node maximizes the chance of hearing the neighbor notices from all neighboring nodes within communication range.

If a neighbor notice is received from a neighboring node, as shown at step 612, the routine 600 proceeds to step 614, where the RF communication component 200 of the orphaned node adds a remote node entry 404 for the neighboring node in its neighbor list 402, including at least the node ID of the neighboring node and the RSSI measurement of the received neighbor notice, along with the hop count, upload hour, and load factor included in the neighbor notice, if specified. The routine 600 next proceeds to step 616, where the RF communication component 200 determines whether the listening period has expired. For example, the RF communication component 200 may be configured to listen for neighbor notices for one hour after broadcasting its orphan notice. If the listening period has not expired, then the routine 600 returns to step 604, where the RF communication component 200 continues to listen for neighbor notices from neighboring nodes on the network.

At a subsequent time, the neighboring node uploads its neighbor list 402 to the host 102, as shown at step 618. The neighboring node may upload its neighbor list 402 on a regularly scheduled basis, for example, or in response to receiving the orphan notice from the orphaned node. Alternatively or additionally, the neighboring node may upload its neighbor list 402 in response to a request or command received from the host 102. As described above, the uploaded neighbor list 402 will contain the remote node entry 404 having the orphan flag 406 indicating that the orphaned node is operating in orphan mode, according to some embodiments.

In further embodiments, the orphaned node may also upload its neighbor list 402 to the host 102. According to some embodiments, if the orphaned node is not assigned a parent (e.g. it is newly installed), the RF communication component 200 may select a best node from its newly created neighbor list 402 as its parent node for transmitting the data containing the neighbor list to the host. For example, the RF communication component 200 may select the remote node in the neighbor list 402 having the highest RSSI measurement, the lowest hop count, and/or the like with which to communicate for uploading the neighbor list to the host 102. In other embodiments, if transmission of the neighbor list 402 fails for all of the configured parent nodes, the RF communication component 200 of the orphaned node may utilize a similar method to select a node from the neighbor list 402 with which to communicate in order to upload its neighbor list to the host.

As shown at step 620, the host 102 receives the neighbor lists 402 from the neighboring node(s) and/or the orphaned node. The routine 600 proceeds from step 620 to step 622, where the routing module 322 executing on the host 102 determines one or more parent nodes for the orphaned mode based on the link score 506 calculated for all of the neighboring nodes of the orphaned node. In some embodiments, the host 102 may wait some period after sending the orphan mode command to the node for any neighboring nodes (and possibly the orphaned node) to upload neighbor lists 402 to the host. For example, the host 102 may wait 3 days for all affected nodes to upload neighbor lists 402. The routing module 322 on the host may then add the remote node entries 404 from the uploaded neighbor lists 402 to the host's neighbors list 502, calculating a link score 506 for each pair of neighboring nodes, as described above in regard to FIG. 5. The routing module 322 may then select one or more parent nodes for the orphaned node based on the link scores 506 for the associated neighboring nodes entries 504.

The routine 600 proceeds from step 622 to step 624, where the routing module 322 assigns the selected parent nodes to the orphaned node. For example, the routing module 322 may send a configuration command message to the orphaned node via one of the selected (primary) parent nodes to assign the selected parent(s) the orphaned node. In response to receiving a configuration command message from the host 102, the orphaned node then reconfigures based on the message and begins communicating through the newly assigned parent node(s), as shown at step 626. In a similar fashion, the routing module 322 may send configuration command message to multiple nodes based on the changed neighboring nodes entries 504 from the uploaded neighbor lists 402 and the recalculated link scores 506 in order to perform re-routing of a portion of the mesh network. From step 626, the routine 600 ends.

According to some embodiments, the orphan mode routine 600 described above may be utilized by a repeater 110 in the AMI network 100 in order to reroute the network in response to the new installation of the repeater or to optimize routing in an existing portion of the network. While the repeater 110 may have valid assigned parent nodes, it may enter the orphan mode upon receiving a command from the host 102 or upon receiving input locally by an installer, repair technician, or other authorized personnel. After sending the orphan notice and receiving neighbor notices from neighboring nodes, the repeater 110 may then upload its newly built neighbor list 402 to the host 102, where the information contained therein may be utilized by the routing module 322 to assign new parents to nodes within communication range of the repeater.

Figure 7:
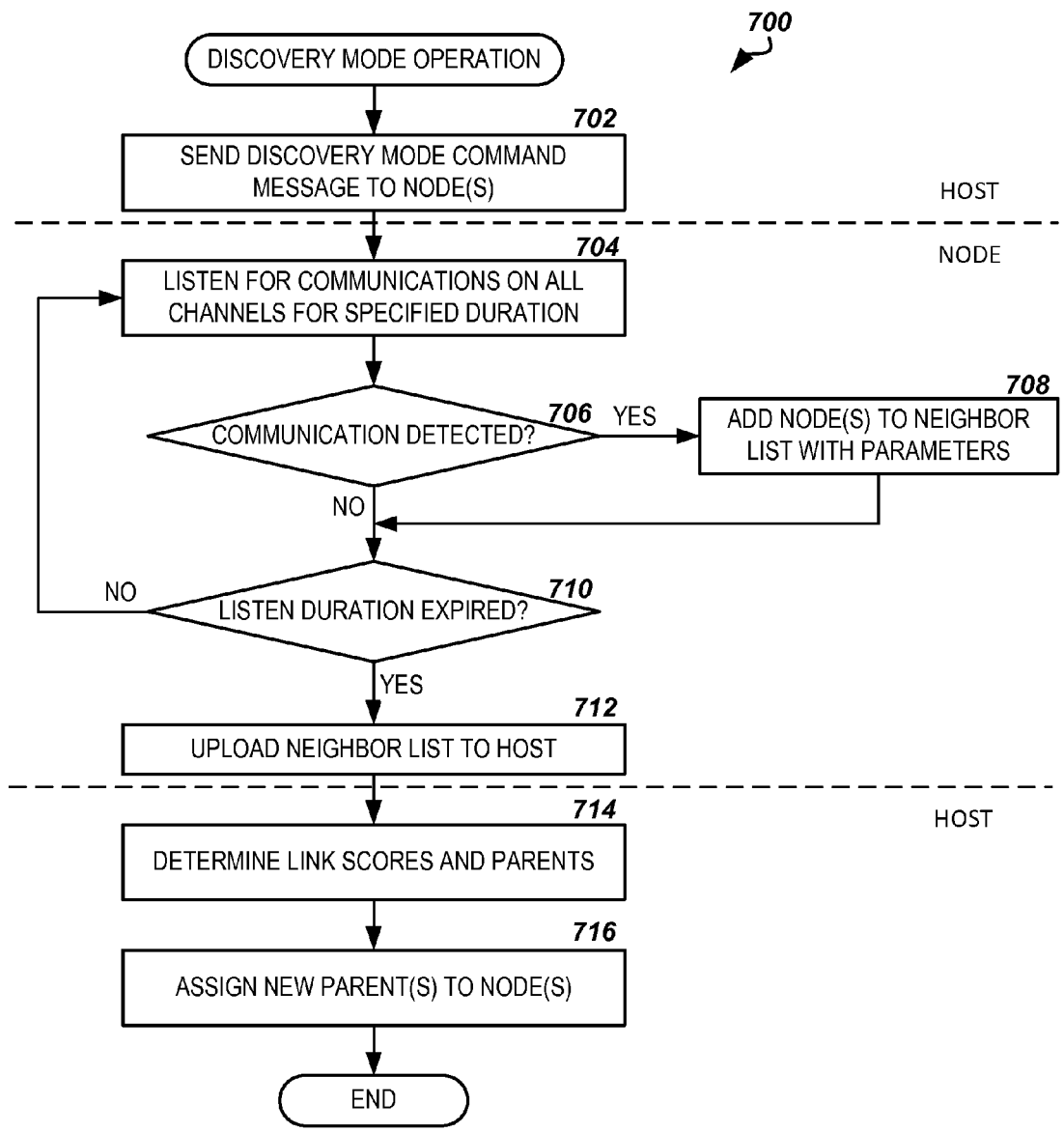
FIG. 7 is a flow diagram showing one routine for collecting information regarding neighboring nodes or devices in a portion of a wireless mesh network to be used to determine new parents for the nodes, according to embodiments described herein.

FIG. 7 is a flow diagram showing another method for dynamically determining and assigning parent nodes and routes for nodes in a mesh network, according to some embodiments. Specifically, FIG. 7 illustrates one routine 700 for collecting information regarding neighboring nodes or devices 106, 108, 110 in a portion of a wireless mesh network comprising the AMI network 100 to be used to determine new parents for the nodes. According to embodiments, a discovery mode may be utilized by nodes to collect neighbor lists 402 with RSSI measurements and upload these neighbor lists to the host 102 using the existing routes in the network. The server may then use the uploaded neighbor lists 402 to perform new routing within the subset of nodes and push the new parent assignments back to the nodes through the network.

According to some embodiments, the routine 700 may be performed by a combination of the routing module 322 of the host 102 and the RF communication component 200 of the affected nodes (devices 106, 108, 110) in the mesh network, as shown in the figure. In other embodiments, the routine 700 may be performed by the host 102, by the RF communication component 200 of one or more devices 106, 108, 110, by other processors or computing systems performing routing for the AMI network 100, or by some other combination of modules, processors and devices.

The routine 700 begins at step 702, where the routing module 322 on the host 102 sends a discovery mode command message to one or more nodes or devices 106, 108, 110 on the mesh network. The discovery mode command message may be sent periodically by the routing module 322 as part of a scheduled re-routing routine for the subset of nodes, or may be sent in response to an action by an administrator of the utility provider's infrastructure. For example, the administrator may select the subset of nodes for which dynamic re-routing is to be performed, thereby causing the routing module 322 to send the discovery mode command message to the selected nodes. According to some embodiments, the discovery mode command message may include a start time and duration in which to the node(s) are to operate in discovery mode. In other embodiments, the discovery mode command message further includes a number of times, e.g. a number of days, that the discovery mode process should be repeated. In some embodiments, the nodes of the wireless mesh network may be configured to enter discovery mode at some scheduled time, without having to receive a discovery mode command message from the host 102.

Next, the routine proceeds from step 702 to step 704, where the RF communication components 200 of the affected nodes begin to listen for all communications from neighbor nodes or devices 106, 108, 110 in the mesh network the specified duration. In some embodiments, the RF communication component 200 utilizes a "promiscuous" state in order to listen for communications between neighboring nodes in the mesh network. Similar to the super-sniff state described above, the RF communication component 200 in the promiscuous state periodically wakeups from the SLEEP state and listens to one or more of the 50 hailing channels and/or 50 data channels for communication traffic. In some embodiments, the RF communication component may listen on all 50 hailing channels and/or data channels for traffic. According to embodiments, the RF communication component 200 may scan a subset of the hailing and/or data channels for some period before returning to the SLEEP state.

At step 706, when a communication between neighboring nodes is detected, e.g. when the RSSI on the scanned channel is above some threshold indicating a transmission is taking place, the routine 700 proceeds to step 708, where the RF communication component 200 of the node adds a remote node entry 404 to its neighbor list 402, including at least the source node ID and the RSSI measurement of the detected communication. The routine 700 next proceeds to step 710, where the RF communication component 200 determines whether the specified listening duration has expired. If the listening duration has not expired, then the routine 700 returns to step 704, where the RF communication component 200 continues to scan the hailing and/or data channels for communications between neighboring nodes.

If the listening period has expired, then the routine 700 proceeds from step 710 to step 712, where the RF communication components 200 of the affected nodes upload their neighbor lists 402 to the host 102. The neighbor list 402 may be uploaded to the host 102 using the existing routes, e.g. the existing parent assignments, in the mesh network. From step 712, the routine 700 proceeds to step 714, where the routing module 322 executing on the host determines one or more parent nodes for the affected nodes based on the link score 506 calculated for all of the neighboring nodes entries 504 updated from the uploaded neighbor lists 402. In some embodiments, the host 102 may wait some period after sending the discovery mode command to the nodes for the affected nodes to upload their neighbor lists 402. For example, the host 102 may wait 3 days for all affected nodes to upload neighbor lists 402. The routing module 322 on the host may then add the remote node entries 404 from the uploaded neighbor lists 402 to the host's neighbors list 502, and recalculate link scores 506 for each pair of neighboring nodes, as described above in regard to FIG. 5. The routing module may then select one or more parent nodes for each of the affected nodes based on the link scores 506 for the associated neighboring nodes entries 504.

The routine 700 proceeds from step 714 to step 716, where the routing module 322 assigns the selected parent nodes to the orphaned node. For example, the routing module 322 may send configuration command messages to the affected nodes via the existing routes in the mesh network to assign the selected parent(s) to each node. In response to receiving a configuration command message from the host 102, the target node then reconfigures based on the message and begins communicating through the newly assigned parent node(s). From step 716, the routine 700 ends.

Based on the foregoing, it will be appreciated that technologies for dynamically determining and assigning parent nodes and routes for nodes in a mesh network are presented herein. While embodiments are described herein in regard to devices 106, 108, 110 of an AMI network 100, those having ordinary skill in the art will recognize that the present disclosure may be utilized in other types mesh networking environments, both wired and wireless, where nodes communicate in a routed fashion, are configured with one or more parent-child relationships. The above-described embodiments are merely possible examples of implementations, set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
    entering, by a first node in a mesh network, an orphan mode;
    broadcasting, by the first node, an orphan notice over the mesh network;
    receiving, at a second node in the mesh network, the orphan notice;
    adding, by the second node, information regarding the first node from the orphan notice to a neighbor list, the information comprising a node ID of the first node specified in the orphan notice, a receive signal strength indicator (RSSI) measurement associated with the orphan notice from the first node, and an indication that the first node is in orphan mode;
    uploading, by the second node, the neighbor list to a host communicatively coupled to the mesh network; and
    receiving, at the first node, an assignment of one or more parent nodes in the mesh network from the host, the assignment of the one or more parent nodes determined based on a link score calculated for the first node and the second node from the information regarding the first node in the uploaded neighbor list.

2. The method of claim 1, wherein the orphan notice is broadcast over a plurality of defined communication channels of the mesh network.

3. The method of claim 1, wherein the orphan notice is broadcast over all 50 available hailing channels of the mesh network, and wherein the first node listens for neighbor notices on the 50 available hailing channels.

4. The method of claim 1, wherein, in response to receiving the orphan notice, the second node further sends a neighbor notice to the first node, the first node adding information regarding the second node from the neighbor notice to its neighbor list.

5. The method of claim 4, wherein the first node further uploads its neighbor list to the host to be utilized in the assignment of the one or more parent nodes for the first node.

6. The method of claim 1, wherein the link score is calculated from at least the RSSI measurement specified in the information regarding the first node.

7. The method of claim 1, wherein the orphan mode is entered by the first node upon determining that the first node has not communicated successfully with an assigned parent node for some duration of time.

8. The method of claim 7, wherein the first node is a repeater in the mesh network with a valid parent assignment.

9. The method of claim 1, wherein the orphan mode is entered by the first node upon receiving an orphan mode command message from the host.

10. A non-transitory computer-readable storage medium having processor-executable instructions stored thereon that, when executed by a processor, cause the processor to:
    send a first command message from a host computer to one or more nodes of a mesh network, the first command message configured to cause each of the one or more nodes to collect communication parameters regarding neighboring nodes in the mesh network and to upload a neighbor list containing the communication parameters to the host computer;

calculate a link score for at least one pair of neighboring nodes in the mesh network based on the communication parameters in the uploaded neighbor lists;

assign one or more parent nodes to at least one of the one or more nodes based on the calculated link scores; and send a second command message to at least one of the one or more nodes, the second command message configured to cause the node to reconfigure based on the second command message and begin communicating through the newly assigned one or more parent nodes.

11. The non-transitory computer-readable storage medium of claim 10, wherein the first command message comprises an orphan mode command message, and wherein at least one node of the mesh network is configured to, upon receiving the orphan mode command message, broadcast an orphan notice over the mesh network, receive a neighbor notice from a neighboring node, and add information regarding the neighboring node from the neighbor notice to the neighbor list.

12. The non-transitory computer-readable storage medium of claim 11, wherein the neighboring node is configured to, upon receiving the orphan notice, add information regarding the at least one node to its neighbor list, and upload the neighbor list to the host computer.

13. The non-transitory computer-readable storage medium of claim 10, wherein the first command message comprises a discovery mode command message, and wherein at least one node of the mesh network is configured to, upon receiving the discovery mode command message, listen for communications between neighboring nodes on the mesh network, and, upon detecting a communication between neighboring nodes, add information regarding a source node of the communications to the neighbor list.

14. The non-transitory computer-readable storage medium of claim 10, wherein the communication parameters regarding a neighboring node comprises a node ID of the neighboring node and an receive signal strength indicator (RSSI) measurement of a communications from the neighboring node.

15. The non-transitory computer-readable storage medium of claim 14, wherein the communication parameters regarding a neighboring node further comprises a hop count and a load factor for the neighboring node.

16. The non-transitory computer-readable storage medium of claim 15, wherein calculating the link score for the at least one pair of neighboring nodes in the mesh network comprises calculating the link score based on weighted factors comprising one or more of the RSSI measurement, the hop count, and the load factor from the neighboring node in the neighbor list.

17. A system comprising:
a device operably configured in an advanced metering infrastructure ("AMI") network; and
an RF communication component operably connected to the device, the RF communication component comprising a processor and a memory containing a firmware, the firmware configured to cause the processor to
receive a discovery mode command message from a host in the AMI network,
listen for communications between neighboring nodes on the AMI network,
upon detecting a communication between neighboring nodes, add information regarding a source node of the communications to a neighbor list, the information comprising a node ID of the source node and a receive signal strength indicator (RSSI) measurement of the detected communication,
upload the neighbor list to the host, and
receive from the host an assignment of one or more parent nodes in the AMI network;
wherein the assignment of the one or more parent nodes defines a route through the AMI network for uploading data from the device to the host, and wherein the assignment of the one or more parent nodes is determined based on a link score calculated for each source node from the information regarding the source node in the uploaded neighbor list.

18. The system of claim 17, wherein the RF communication component is configured to listen for communications between neighboring nodes on a plurality of defined communication channels of the AMI network for a defined period time.

19. The system of claim 17, wherein the link score is calculated from at least the RSSI measurement specified in the information regarding the source node.

20. The system of claim 17, wherein the device comprises an advanced metering device for measuring usage of a utility, and wherein the data uploaded from the device to the host comprises usage data regarding the usage of the utility.

* * * * *